United States Patent
Barnes

(10) Patent No.: US 11,179,904 B2
(45) Date of Patent: Nov. 23, 2021

(54) THREE-DIMENSIONAL (3D) PART FINISHING SYSTEM

(71) Applicant: HEWLETT-PACKARD DEVELOPMENT COMPANY, L.P., Houston, TX (US)

(72) Inventor: Arthur H. Barnes, Vancouver, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/075,496

(22) PCT Filed: Apr. 12, 2017

(86) PCT No.: PCT/US2017/027224
§ 371 (c)(1),
(2) Date: Aug. 3, 2018

(87) PCT Pub. No.: WO2018/190829
PCT Pub. Date: Oct. 18, 2018

(65) Prior Publication Data
US 2021/0276288 A1   Sep. 9, 2021

(51) Int. Cl.
*B29C 64/165*   (2017.01)
*B29C 64/393*   (2017.01)
(Continued)

(52) U.S. Cl.
CPC ........ *B29C 71/0009* (2013.01); *B29C 64/165* (2017.08); *B29C 64/393* (2017.08);
(Continued)

(58) Field of Classification Search
CPC . B29C 71/0009; B29C 64/165; B29C 64/393; B33Y 10/00; B33Y 40/20; B33Y 50/02; B33Y 30/00
See application file for complete search history.

(56) References Cited

U.S. PATENT DOCUMENTS

| 5,143,663 A | 9/1992 | Leyden et al. |
| 8,506,862 B2 | 8/2013 | Giller et al. |

(Continued)

FOREIGN PATENT DOCUMENTS

| WO | 2003089218 A1 | 10/2003 |
| WO | 2014155039 A1 | 10/2014 |

OTHER PUBLICATIONS

"Building an Acetone Vapor Bath for Smoothing 3d-printed Parts", Sink Hacks, Retrieved from Internet: http://sinkhacks.com/building-acetone-vapor-bath-smoothing-3d-printed-parts/, Apr. 9, 2014, 10 pages.

(Continued)

*Primary Examiner* — Nahida Sultana
(74) *Attorney, Agent, or Firm* — Dierker & Kavanaugh PC

(57) ABSTRACT

A three-dimensional (3D) part finishing system includes a submerging apparatus to receive a 3D printed part, and a liquid supply container to receive the submerging apparatus. The system further includes a controller operatively connected to the submerging apparatus. The controller is to receive or determine an input time for the 3D printed part and to control submersion of the submerging apparatus into the liquid supply container for the input time.

15 Claims, 6 Drawing Sheets

(51) Int. Cl.
    *B33Y 50/02*        (2015.01)
    *B33Y 30/00*        (2015.01)
    *B33Y 40/20*        (2020.01)
    *B33Y 10/00*        (2015.01)
    *B29C 71/00*        (2006.01)

(52) U.S. Cl.
    CPC ............... B33Y 10/00 (2014.12); B33Y 30/00 (2014.12); B33Y 40/20 (2020.01); B33Y 50/02 (2014.12)

(56) References Cited

U.S. PATENT DOCUMENTS

| | | |
|---|---|---|
| 2003/0067098 A1 | 4/2003 | Newell et al. |
| 2005/0173838 A1 | 8/2005 | Priedeman et al. |
| 2015/0231828 A1* | 8/2015 | El-Siblani .............. B33Y 30/00 264/109 |
| 2020/0061708 A1* | 2/2020 | Jepeal .................... B29C 64/30 |

OTHER PUBLICATIONS

Zarringhalam et al., "Post-Processing Of Duraform™ Parts For Rapid Manufacture", Retrieved from Internet: https://sffsymposium.engr.utexas.edu/Manuscripts/2003/2003-57-Zarringhalam.pdf, Sep. 26, 2003, pp. 596-606.

* cited by examiner

THREE-DIMENSIONAL (3D) PART FINISHING SYSTEM

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. Some 3D printing methods use chemical binders or adhesives to bind build materials together. Other 3D printing methods involve at least partial curing or fusing or melting of the build material. For some materials, at least partial melting may be accomplished using heat-assisted extrusion, and for some other materials (e.g., polymerizable materials), curing or fusing may be accomplished using, for example, ultraviolet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
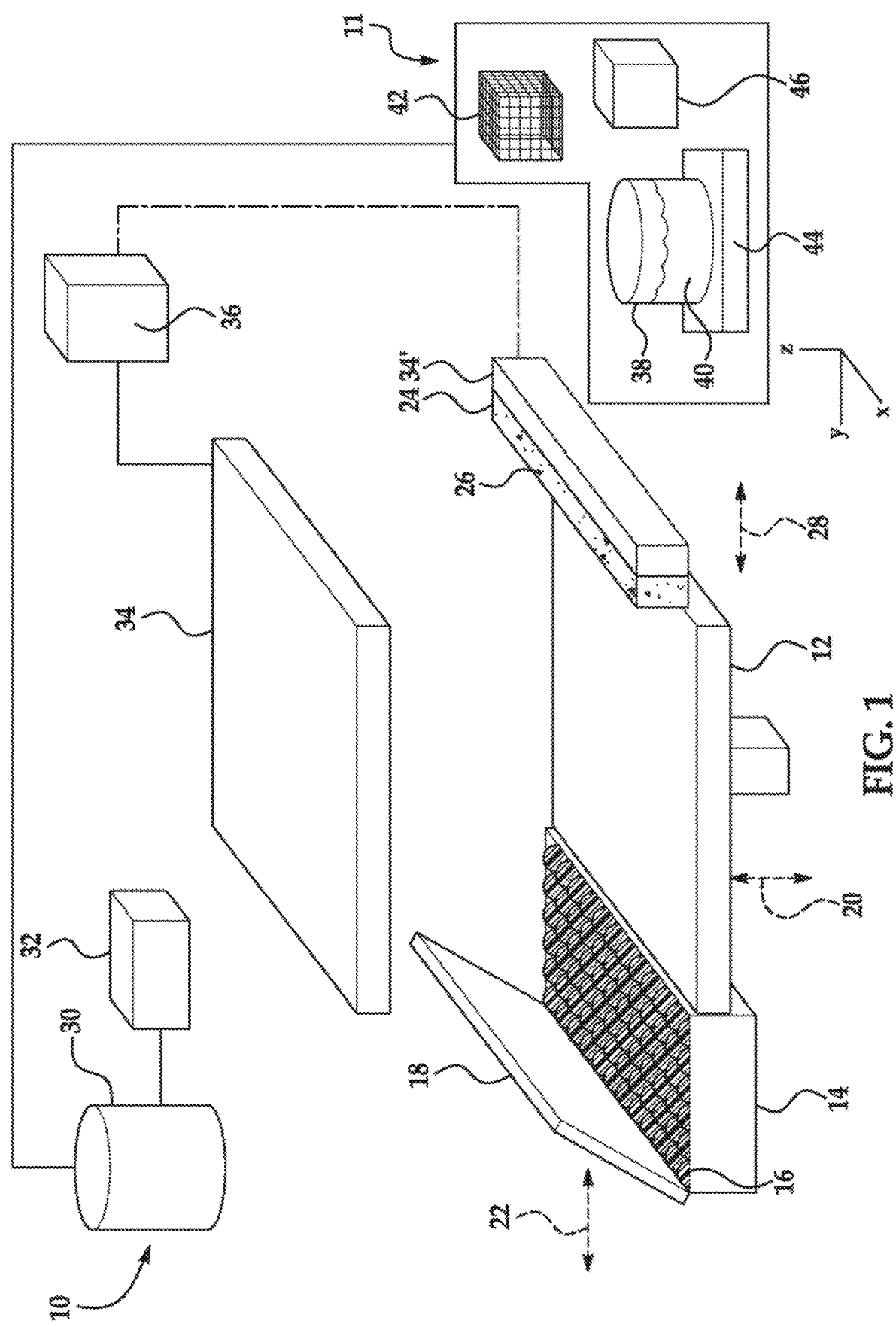
FIG. 1 a simplified isometric and schematic view of an example of a 3D printing system and a 3D part finishing system disclosed herein.

Three-dimensionally (3D) printed parts may be formed by a variety of techniques, such as fused deposition modeling, or those techniques that utilize a build material, a fusing agent, and electromagnetic radiation. In the examples disclosed herein, it has been found that submerging a 3D printed part in a liquid that is at a temperature that is above the melting point of a polymeric or polymeric composite build material (from which the 3D printed part was formed) and below the boiling point of the liquid causes the 3D printed part to become: smooth; glossy; uniform in color; an intended color, or a combination thereof. The submerging process forms a treated 3D part.

As used herein, the terms "3D printed part," "3D part," "printed part," or "part" may be a completed 3D printed part or layer(s) of a 3D printed part printed via any suitable 3D printing technique. These terms may also be referring to an "untreated 3D part," which is the printed part before it has been submerged in the liquid disclosed herein.

Also as used herein, the terms "treated 3D printed part," "treated 3D part," or "treated part" refer to a 3D printed part that has been submerged in the liquid disclosed herein for a predetermined amount of time when the liquid is at a temperature that is above the melting point of the polymeric or polymeric composite build material (from which the 3D printed part was formed) and below the boiling point of the liquid.

The submerging process disclosed herein may fuse residual unfused or partially unfused build material powder that remains attached to the 3D printed part. The fusing of at least some of this unfused powder may reduce the surface roughness of the treated 3D printed parts, may help the treated 3D part to exhibit an intended color (e.g., by removing unfused build material that has a different color than the fused build material), and/or may help the treated 3D part to be exhibit more uniform coloring (e.g., by removing unfused build material that has a different color than the fused build material).

By "smooth," it is meant that the treated 3D part has an at least 6 times reduction in surface roughness (e.g., as measured by a profilometer), when compared to the untreated 3D printed part. In some examples, the treated 3D part can have up 10 times of a reduction in surface roughness, when compared to the untreated 3D printed part. The surface roughness may be presented as $R_a$, which is the average of a set of individual measurements of a surface's peaks and valleys.

By "glossy," it is meant that the treated 3D part exhibits at least a 6 times improvement in gloss (e.g., as measured by a glossmeter), when compared to the untreated 3D printed part.

By "uniform in color," it is meant that the hue at a localized section of the treated part or the hue across the entire treated part appears to be the same. As an example, a part may be considered uniform in color when either no (or very little) unfused or partially fused build material is visible at the surface of the part or the unfused build material attached to section(s) of the fused build material is the same color as the section(s). As another example, a multicolored part (i.e., a part with different colors at different sections) may be considered to be uniform in color if the respective sections exhibit a single color rather than two competing colors (e.g., a red section appears red rather than red and white, a black section appears black rather than black and white, etc.). Two competing colors may be present when a colored fusing agent is used to form the 3D part. The fusing agent may be colored due to the presence of a colored active material and/or due to a colorant that has been added to the fusing agent. The colored fusing agent may impart its color to the fused build material during fusing, which may be a different color than the unfused build material. Thus, when unfused build material remains attached to section(s) of the fused build material formed with the colored fusing agent, there may be two competing colors in the section(s) of the part. Attached unfused build material may also cause the part to have a hazy appearance, which deleteriously affects the color uniformity.

By "intended color," it is meant that a localized section of the treated part or the entire treated part exhibits a hue of a colored fusing agent used to form the 3D part. When unfused build material remains attached to section(s) of the fused build material, the 3D part formed with a colored fusing agent may have an off or skewed color (i.e., a color that is not the same as the colored fusing agent). For example, when a black fusing agent is used to form the 3D part, the desired color of the part is black. However, unfused white build material at the surface of this part in combination with the fused black build material, may cause the part to look grey. The intended color may be measured in terms of lightness (i.e., L*). For example, a treated 3D part may exhibit an L* value that is closer to the L* value of the desired color, when compared to the L* value of the untreated 3D printed part. As an example, a treated part that exhibits a black color may have an L* value of 22, while its untreated version may exhibit a grey color and have an L* value of 37 (which is further away from the darkest black L* value of 0).

As previously mentioned, submerging the 3D printed part in the liquid at the predefined temperature and for a predefined time causes the 3D part to become one or more of smooth; glossy; uniform in color; or the intended color. Without being bound to any theory, it is believed the liquid may melt the outermost layer or shell of the treated part, along with any unfused build material attached thereof. As a result, the unfused build material may be integrated into the exterior portion of the treated part. This process may cause the outermost layer or shell of the treated part to become smooth, glossy, uniform in color, and/or the intended color, without melting the interior or core of the treated part.

The liquid in which the 3D part is submerged, and with which the 3D part is treated, may be selected based on one or more of the following parameters: being non-toxic or food-grade; being water-soluble; having a high boiling point; having a high flash point; having high thermal conductivity; and/or having a fluid density that is less than the density of the 3D part. It may be desirable to use a liquid that is non-toxic or food-grade so that the treated part does not retain a toxic or harmful residue. It may be desirable to use a liquid that is water-soluble so that the liquid may be easily rinsed from the treated 3D part after submersion. It may be desirable to use a liquid that has a high boiling point (e.g., a boiling point greater than 200° C.) so that the liquid does not evaporate when it is heated to a temperature above the melting point of the polymeric or polymeric composite build material. It may be desirable, at least in some instances, to use a liquid that has a high flash point. By "high flash point," it is meant that the lowest temperature at which vapors of the liquid are capable of igniting is greater than the temperature of the liquid at the time the 3D part is submerged therein. In an example, the flash point may be greater than 300° C. It may be desirable to use a liquid that has a high thermal conductivity (e.g., a thermal conductivity of at least 0.20 W/mK). With this characteristic, the liquid may be at least substantially uniformly heated so that the entire part can be exposed to at least substantially the same temperature. It may be desirable to use a liquid that has a fluid density that is less than the density of the part so that the part is not buoyant during the submersion.

In an example, the liquid is selected from the group consisting of glycerin, avocado oil, almond oil, canola oil, and combinations thereof. For example, glycerin may be desirable to use as the liquid as it is a food-grade, water-soluble liquid with a boiling point of 290° C., a flash point of about 176° C. (open cup), a high thermal conductivity (e.g., 0.287 W/mK), and a fluid density of about 1.25 g/cm$^3$. While some examples have been provided, it is to be understood that other like liquids may also be used.

In an example, the boiling point of the liquid is above 200° C. In another example, the boiling point of the liquid is above 280° C.

Referring now to FIG. 1, an example of a 3D part finishing system 11 is schematically depicted. This system 11 includes a submerging apparatus 42 to receive a 3D printed part, a liquid supply container 38 to removably receive the submerging apparatus 42, and a controller 30 operatively connected to the submerging apparatus 42, where the controller 42 is to receive or determine an input time for the 3D printed part and to control submersion of the submerging apparatus 42 into the liquid supply container 38 for the input time.

Figure 3A:
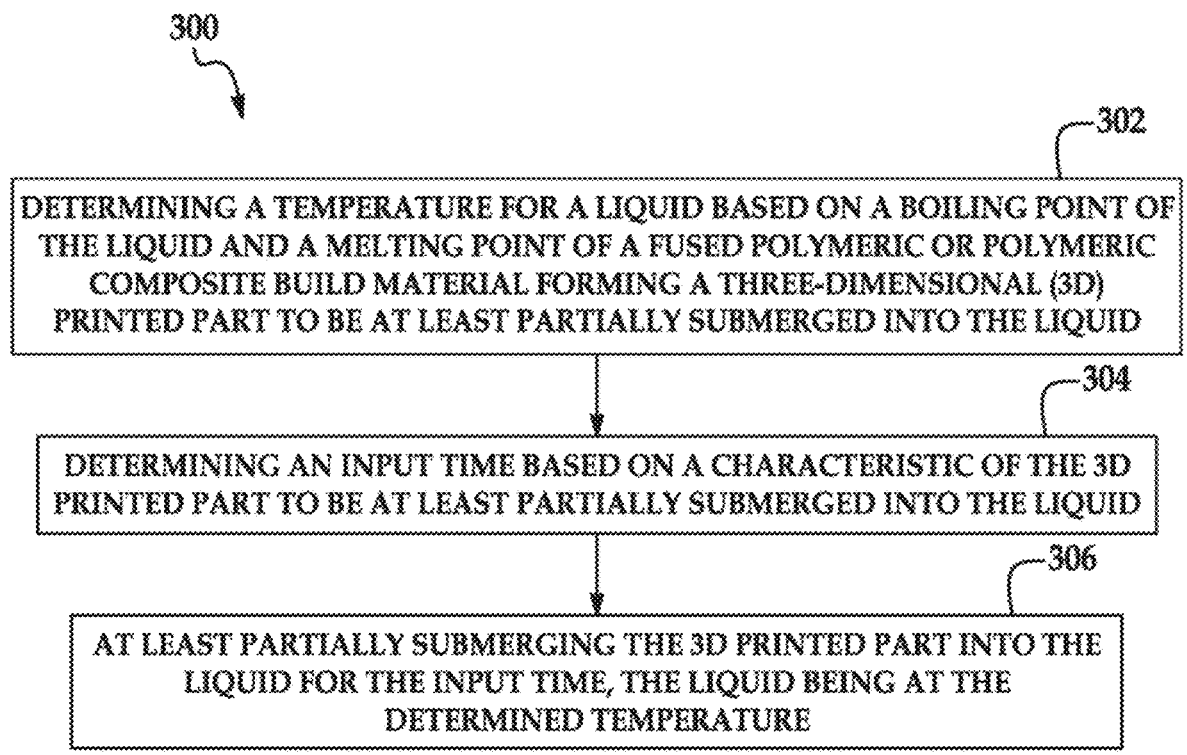
FIG. 3A is a flow diagram illustrating an example of a 3D part finishing method disclosed herein.

After a 3D part is formed by any suitable 3D printing technique, the 3D printed part may be processed according to an example of the method disclosed herein. This method may be referred to as a 3D part finishing method. An example of this method 300 is shown in FIG. 3A. As depicted at reference numeral 302 in FIG. 3A, this method 300 includes determining a temperature for a liquid based on a boiling point of the liquid and a melting point of a fused polymeric or polymeric composite build material forming a three-dimensional (3D) printed part to be at least partially submerged into the liquid. The method 300 also includes determining an input time based on a characteristic of the 3D printed part to be at least partially submerged into the liquid, as shown at reference numeral 304; and at least partially submerging the 3D printed part into the liquid for the input time, the liquid being at the determined temperature, as shown at reference numeral 306.

In some examples, the 3D part finishing method 300 may be performed immediately after 3D printing, without any other post-printing processes (e.g., cleaning) first being performed. For example, a 3D part formed via fused deposition modeling may be subjected to the 3D part finishing method 300 without first being cleaned via sand blasting, bead blasting, brushing, washing, or the like. In other examples, after 3D printing and prior to performing the 3D part finishing method 300, the 3D printed part may undergo a post-printing cleaning. For example, 3D parts formed with powder build materials may be exposed to a post-printing cleaning (e.g., sand blasting, bead blasting, brushing, washing, or the like) prior to being submerged.

Both the 3D part finishing system 11 and the method 300 will be further described in reference to FIG. 1 and FIGS. 2A through 2G.

In FIG. 1, the 3D part finishing system 11 is shown with an example of a 3D printing system 10. It is to be understood that the 3D printing system 10 and the 3D part finishing system 11 may be separate systems for printing the part and for performing the finishing method on the part, or they may be integrating into a single system, or they may be separate systems 10, 11 that are operatively connected to a single controller 30.

Moreover, it is to be understood that while the 3D part finishing system 11 is shown with the 3D printing system 10, other 3D printing systems may be used to form the 3D part that is then utilized in the 3D part finishing system 11.

Still further, it is to be understood that the 3D printing system 10 and the 3D part finishing system 11 may include additional components and that some of the components described herein may be removed and/or modified. Furthermore, components of the 3D printing system 10 and the 3D part finishing system 11 depicted in FIG. 1 may not be drawn to scale and thus, the 3D printing system 10 and the 3D part finishing system 11 may have a different size and/or configuration other than as shown therein.

The printing system 10 generally includes a supply 14 of polymeric or polymeric composite build material 16; a build material distributor 18; a supply of a fusing agent 26; an applicator 24 for selectively dispensing the fusing agent 26; and a source 34, 34' of electromagnetic radiation 54. The 3D part finishing system 11 generally includes a submerging apparatus 42 to receive a 3D printed part and a liquid supply container 38 to removably receive the submerging apparatus 42. In the example shown in FIG. 1, the systems 10, 11 include the controller 30. A single controller 30 may, or separate controllers may respectively, process print data based on a 3D object model of the 3D part to be generated, process 3D part characteristic data to determine an input time for the submersion of the part, process data to control heater(s) 44 and/or chiller(s) 46 of the system 11, and process data to control the submerging apparatus 42 such that it submerges the 3D part into the supply 38 of the liquid 40 for a predetermined amount of time (i.e., the input time).

As shown in FIG. 1, the printing system 10 includes a build area platform 12, the build material supply 14 containing the polymeric or polymeric composite build material particles 16, and the build material distributor 18.

The build area platform 12 receives the polymeric or polymeric composite build material 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is also one example, and could be replaced with another support member, such as a platen, a fabrication/print bed, a glass plate, or another build surface.

Figure 2A:
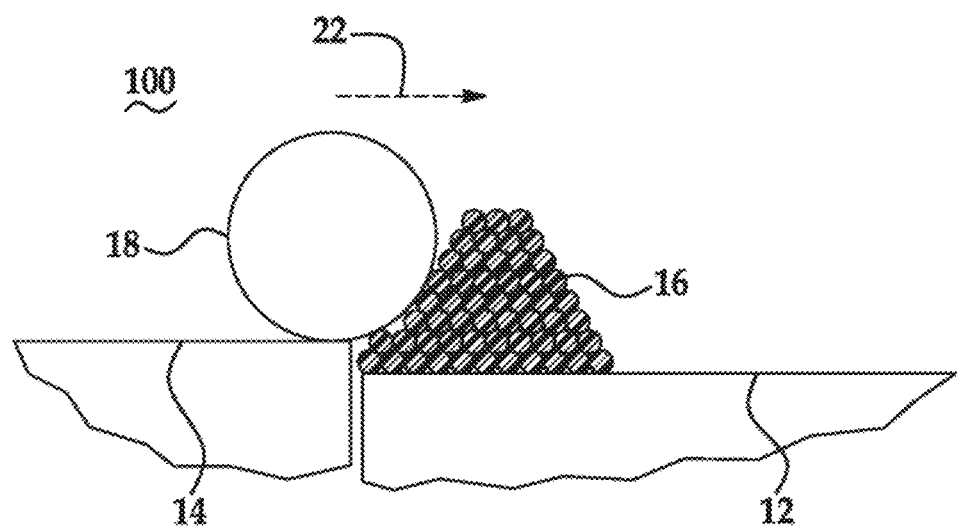
FIGS. 2A through 2G are schematic and partially cross-sectional views depicting the formation of a treated 3D part using examples of a 3D printing method and a 3D part finishing method disclosed herein.
Figure 2B:
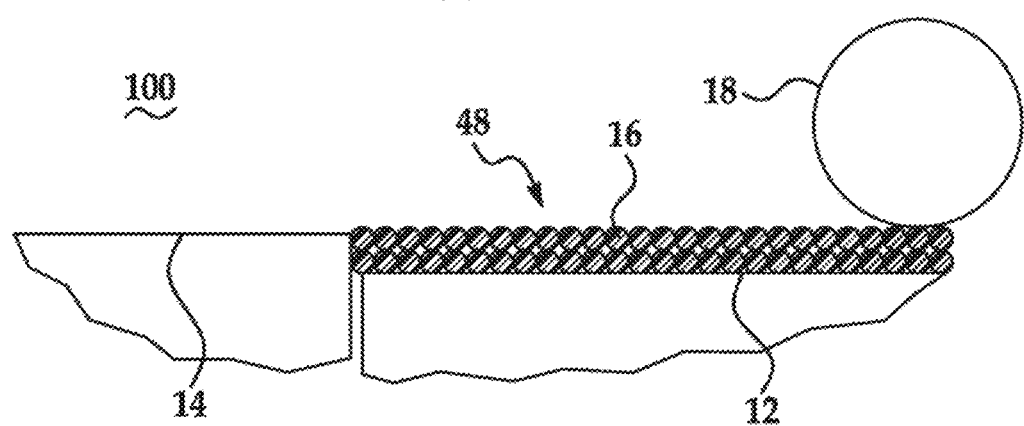
Figure 2C:
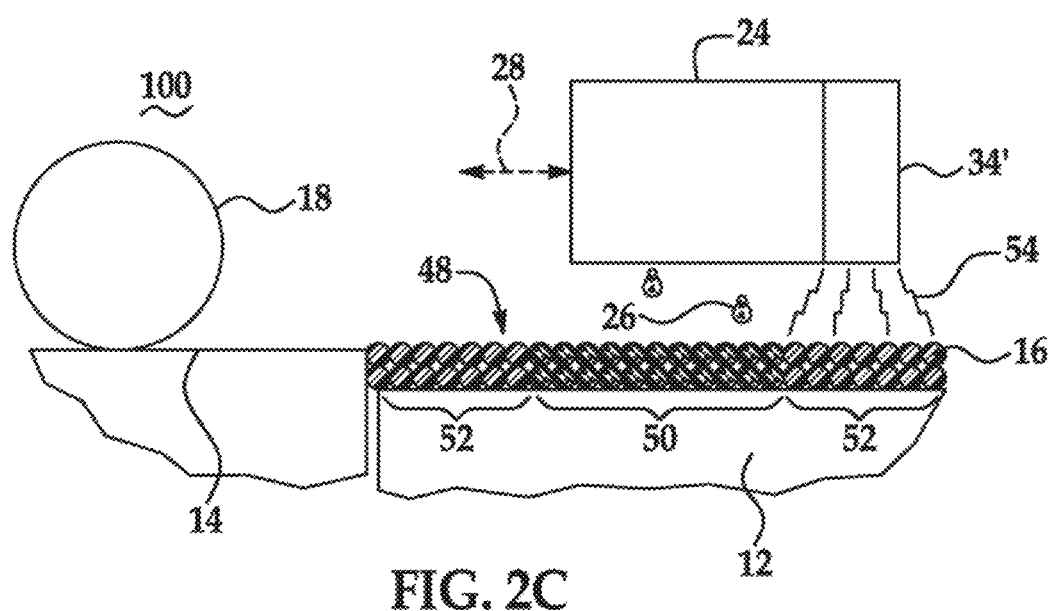
Figure 2D:
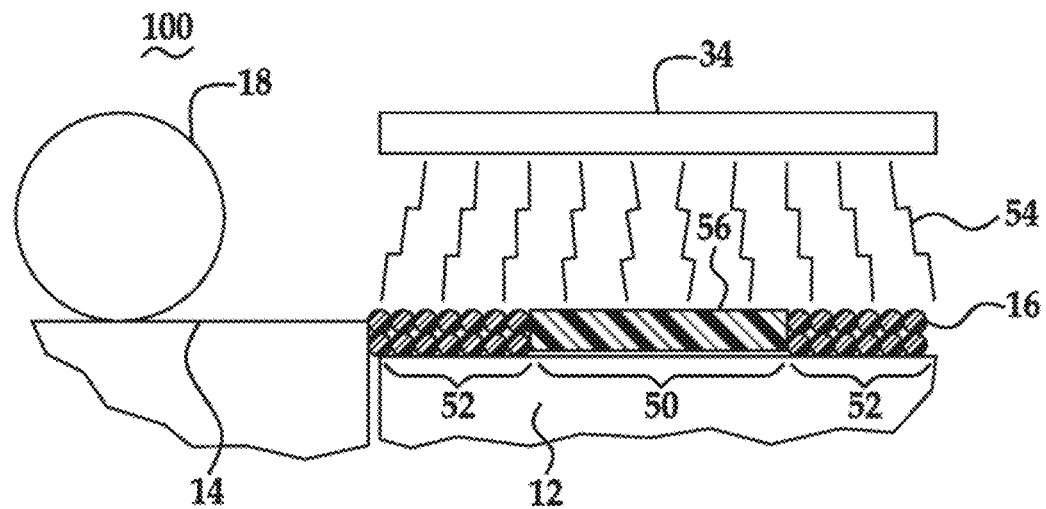
Figure 2E:
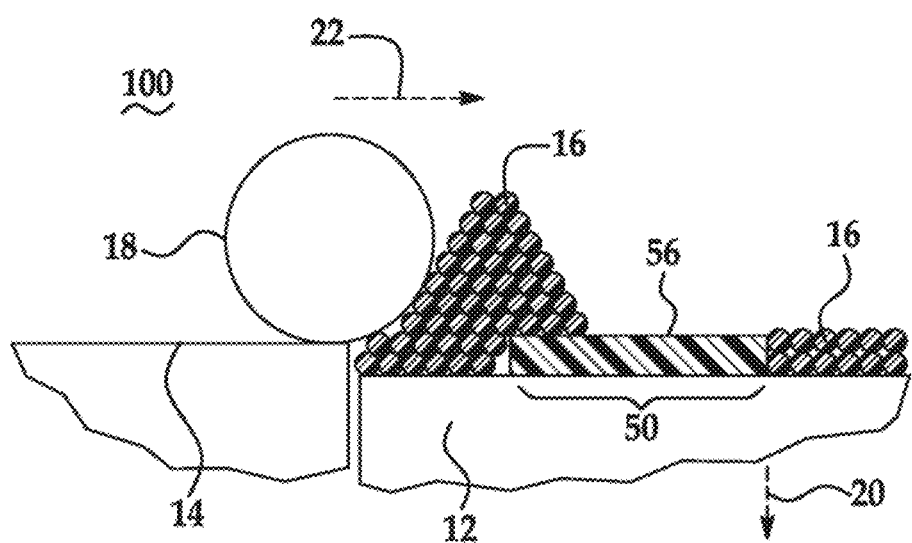
Figure 2F:
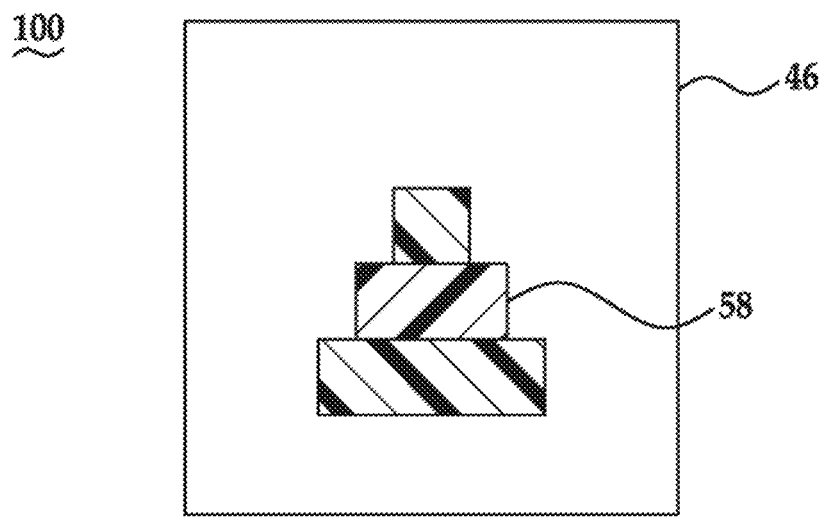

The build area platform 12 may be moved in a direction as denoted by the arrow 20, e.g., along the z-axis, so that polymeric or polymeric composite build material 16 may be delivered to the platform 12 or to a previously formed layer of the 3D part 58 (see, e.g., FIG. 2F). In an example, when the polymeric or polymeric composite build material particles 16 are to be delivered, the build area platform 12 may be programmed to advance (e.g., downward) enough so that the build material distributor 18 can push the polymeric or polymeric composite build material particles 16 onto the platform 12 to form a substantially uniform layer of the polymeric or polymeric composite build material 16 thereon (see, e.g., FIGS. 2A and 2B). The build area platform 12 may also be returned to its original position, for example, when a new part is to be built.

The build material supply 14 may be a container, bed, or other surface that is to position the polymeric or polymeric composite build material particles 16 between the build material distributor 18 and the build area platform 12. In some examples, the build material supply 14 may include a surface upon which the polymeric or polymeric composite build material particles 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the polymeric or polymeric composite build material particles 16 from a storage location to a position to be spread onto the build area platform 12 or onto a previously formed layer of the 3D part 58.

The build material distributor 18 may be moved in a direction as denoted by the arrow 22, e.g., along the y-axis, over the build material supply 14 and across the build area platform 12 to spread a layer of the polymeric or polymeric composite build material 16 over the build area platform 12. The build material distributor 18 may also be returned to a position adjacent to the build material supply 14 following the spreading of the polymeric or polymeric composite build material particles 16. The build material distributor 18 may be a blade (e.g., a doctor blade), a roller, a combination of a roller and a blade, and/or any other device capable of spreading the polymeric or polymeric composite build material 16 over the build area platform 12. For instance, the build material distributor 18 may be a counter-rotating roller.

The polymeric or polymeric composite build material particles 16 may be a polymeric build material or a polymeric composite build material. As used herein, the term "polymeric build material" may refer to crystalline or semi-crystalline polymer particles. As used herein, the term "polymeric composite build material" may refer or composite particles made up of polymer and ceramic. Any of the polymeric or polymeric composite build material particles 16 may be in powder form.

Examples of semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other examples of crystalline or semi-crystalline polymers suitable for use as the build material particles 16 include polyethylene, polypropylene, and polyoxomethylene (i.e., polyacetals). Still other examples of suitable build material particles 16 include polystyrene, polycarbonate, polyester, polyurethanes, other engineering plastics, and blends of any two or more of the polymers listed herein.

Any of the previously listed crystalline or semi-crystalline polymer particles may be combined with ceramic particles to form the polymeric composite build material particles 16. Examples of suitable ceramic particles include metal oxides, inorganic glasses, carbides, nitrides, and borides. Some specific examples include alumina ($Al_2O_3$), glass, silicon mononitride (SiN), silicon dioxide ($SiO_2$), zirconia ($ZrO_2$), titanium dioxide ($TiO_2$), or combinations thereof. The amount of ceramic particles that may be combined with the crystalline or semi-crystalline polymer particles may depend on the materials used and the 3D part 58 (see, e.g., FIG. 2F) to be formed. In one example, the ceramic particles may be present in an amount ranging from about 1 wt % to about 20 wt % based on the total wt % of the polymeric composite build material particles 16.

The polymeric or polymeric composite build material particles 16 may have a melting point or softening point ranging from about 50° C. to about 300° C. In an example, the melting point of the polymeric or polymeric composite build material 16 is below 300° C. As another example, the build material particles 16 may be a polyamide having a softening point of 180° C. and a melting point of 187° C. or a polyamide having a softening point of 195° C. and a melting point of 200° C.

The polymeric or polymeric composite build material particles 16 may be made up of similarly sized particles or differently sized particles. The term "size", as used herein with regard to the polymeric or polymeric composite build material particles 16, refers to the diameter of a spherical particle, or the average diameter of a non-spherical particle (i.e., the average of multiple diameters across the particle), or the volume-weighted mean diameter of a particle distribution. In an example, the average size of the polymeric or polymeric composite build material particles 16 ranges from 5 μm to about 200 μm.

It is to be understood that the polymeric or polymeric composite build material 16 may include, in addition to polymeric or polymeric composite particles, a charging agent, a flow aid, or combinations thereof.

Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the polymeric or polymeric composite build material 16.

Flow aid(s) may be added to improve the coating flowability of the polymeric or polymeric composite build material 16. Flow aid(s) may be particularly beneficial when the particles of the polymeric or polymeric composite build material 16 are less than 25 μm in size. The flow aid improves the flowability of the polymeric or polymeric composite build material 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total wt % of the polymeric or polymeric composite build material 16.

As shown in FIG. 1, the printing system 10 also includes the applicator 24, which may contain the fusing agent 26.

Examples of the fusing agent 26 are dispersions including a radiation absorbing agent (i.e., an active material). The amount of the active material in the fusing agent 26 may depend upon how absorbing the active material is. In an example, the fusing agent 26 may include the active material and be applied in an amount sufficient to include at least 0.01 wt % of the active material in the 3D part 58. When the active material is black, even this low amount can produce a black colored part. Higher weight percentages may darken the color.

The active material may be any infrared light absorbing colorant. In an example, the active material is a near-infrared light absorber. Any near-infrared colorants, e.g., those produced by Fabricolor, Eastman Kodak, or Yamamoto, may be used in the fusing agent 26. As one example, the fusing agent 26 may be a printing liquid formulation including carbon black as the active material. Examples of this printing liquid formulation are commercially known as CM997A, 516458, C18928, C93848, C93808, or the like, all of which are available from Hewlett-Packard Company. As another example, the fusing agent 26 may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water soluble near-infrared absorbing dyes selected from the group consisting of:

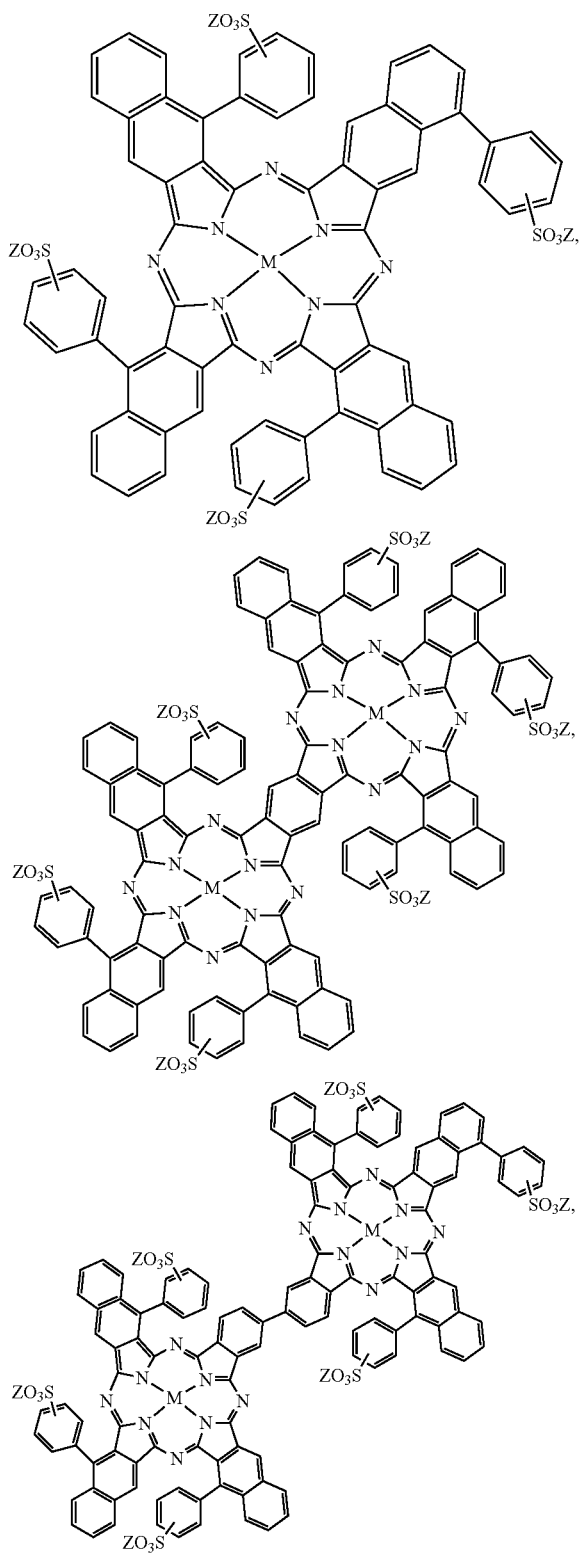

-continued

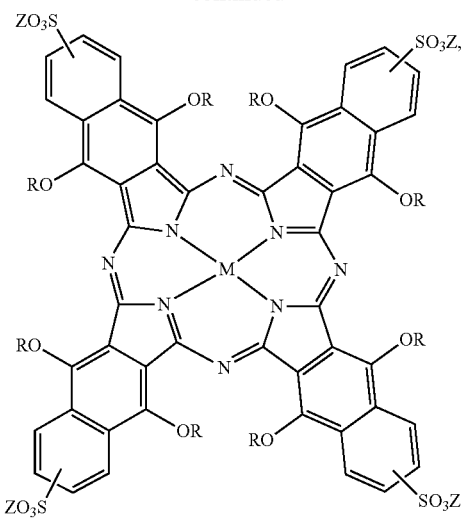

and mixtures thereof. In the above formulations, M can be a divalent metal atom (e.g., copper, etc.) or can have OSO₃Na axial groups filling any unfilled valencies if the metal is more than divalent (e.g., indium, etc.), R can be any C1-C8 alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

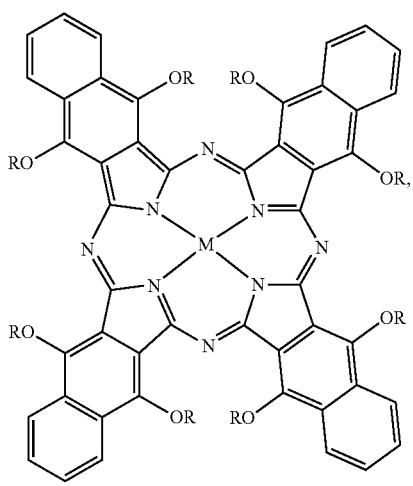

-continued

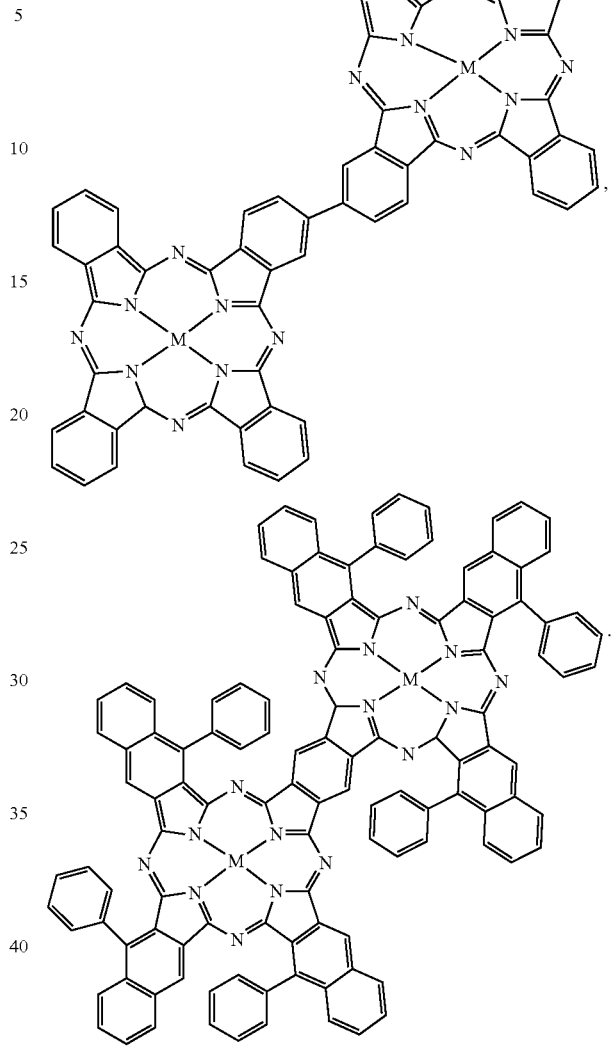

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be any C1-C8 alkyl group (including substituted alkyl and unsubstituted alkyl).

In other examples, the active material may be a plasmonic resonance absorber. The plasmonic resonance absorber allows the fusing agent 26 to absorb radiation at wavelengths ranging from 800 nm to 4000 nm (e.g., at least 80% of radiation having wavelengths ranging from 800 nm to 4000 nm is absorbed), which enables the fusing agent 26 to convert enough radiation to thermal energy so that the polymeric or polymeric composite build material particles 16 fuse. The plasmonic resonance absorber also allows the fusing agent 26 to have transparency at wavelengths ranging from 400 nm to 780 nm (e.g., 20% or less of radiation having wavelengths ranging from 400 nm to 780 nm is absorbed), which enables the 3D part 58 to be white or slightly colored.

The absorption of the plasmonic resonance absorber is the result of the plasmonic resonance effects. Electrons associated with the atoms of the plasmonic resonance absorber may be collectively excited by electromagnetic radiation 54, which results in collective oscillation of the electrons. The wavelengths that excite and oscillate these electrons collectively are dependent on the number of electrons present in the plasmonic resonance absorber particles, which in turn is dependent on the size of the plasmonic resonance absorber particles. A low amount of energy will collectively oscillate the particle's electrons, such that very small particles (e.g., 1-100 nm) may absorb electromagnetic radiation 54 with wavelengths several times (e.g., from 8 to 800 or more times) the size of the particles. The use of these particles allows the fusing agent 26 to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter (e.g., volume-weighted mean diameter) ranging from greater than 0 nm to less than 220 nm. In another example the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride ($LaB_6$), tungsten bronzes ($A_xWO_3$), indium tin oxide ($In_2O_3:SnO_2$, ITO), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO_4$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the active material that is present in the fusing agent 26 ranges from greater than 0 wt % to about 40 wt % based on the total wt % of the fusing agent 26. In other examples, the amount of the active material in the fusing agent 26 ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the fusing agent 26 having jetting reliability and heat and/or electromagnetic radiation absorbance efficiency.

As used herein, "FA vehicle" may refer to the liquid fluid in which the active material is placed to form the fusing agent 26. A wide variety of FA vehicles, including aqueous and non-aqueous vehicles, may be used in the fusing agent 26. In some instances, the FA vehicle may include water alone or a non-aqueous solvent alone. In other instances, the FA vehicle may further include dispersing additive(s), co-solvent(s), surfactant(s), antimicrobial agent(s), anti-kogation agent(s) silane coupling agent(s), and/or chelating agent(s).

When the active material is the plasmonic resonance absorber, the plasmonic resonance absorber may, in some instances, be dispersed with a dispersing additive. As such, the dispersing additive helps to uniformly distribute the plasmonic resonance absorber throughout the fusing agent 26. The dispersing additive may also aid in the wetting of the fusing agent 26 onto the polymeric or polymeric composite build material particles 16. Some examples of the dispersing additive include a water soluble acrylic acid polymer (e.g., CARBOSPERSE® K7028 available from Lubrizol), a styrene-acrylic pigment dispersion resin (e.g., JONCRYL® 671 available from BASF Corp.), a high molecular weight block copolymer with pigment affinic groups (e.g., DISPERBYK®-190 available BYK Additives and Instruments), and combinations thereof.

Whether a single dispersing additive is used or a combination of dispersing additives is used, the total amount of dispersing additive(s) in the fusing agent 26 may range from about 10 wt % to about 200 wt % based on the wt % of the plasmonic resonance absorber in the fusing agent 26.

When the FA vehicle is water-based, the aqueous nature of the fusing agent 26 enables the fusing agent 26 to penetrate, at least partially, into the layer of the polymeric or polymeric composite build material 16. The polymeric or polymeric composite build material 16 may be hydrophobic, and the presence of a co-solvent and/or a surfactant in the fusing agent 26 may assist in obtaining a particular wetting behavior.

Examples of suitable co-solvents include 2-pyrrolidinone, N-methylpyrrolidone, 1-(2-hydroxyethyl)-2-pyrrolidinone, 1,6-hexanediol or other diols (e.g., 1,5-pentanediol, 2-methyl-1,3-propanediol, etc.), triethylene glycol, tetraethylene glycol, tripropylene glycol methyl ether, or the like, or combinations thereof.

Whether used alone or in combination, the total amount of the co-solvent(s) ranges from about 1 wt % to about 80 wt % of the total wt % of the fusing agent 26.

Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the fusing agent 26 may range from about 0.1 wt % to about 4 wt % based on the total wt % of the fusing agent 26.

The FA vehicle may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® M20 (Thor), and combinations thereof.

In an example, the fusing agent 26 may include a total amount of antimicrobial agents that ranges from about 0.1 wt % to about 1 wt %. In an example, the antimicrobial agent is a biocide and is present in the fusing agent 26 in an amount of about 0.32 wt % (based on the total wt % of the fusing agent 26). In another example, the antimicrobial agent is a biocide and is present in the fusing agent 26 in an amount of about 0.128 wt % (based on the total wt % of the fusing agent 26).

An anti-kogation agent may be included in the fusing agent 26. Kogation refers to the deposit of dried ink (e.g., fusing agent 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the fusing agent 26 may range from about 0.1 wt % to about 5 wt % based on the total wt % of the fusing agent 26.

When the active material is the plasmonic resonance absorber, a silane coupling agent may be added to the fusing agent 26 to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the fusing agent 26 may range from about 0.1 wt % to about 50 wt % based on the wt % of the plasmonic resonance absorber in the fusing agent 26. In an example, the total amount of silane coupling agent(s) in the fusing agent 26 ranges from about 1 wt % to about 30 wt % based on the wt % of the plasmonic resonance absorber. In another example, the total amount of silane coupling agent(s) in the fusing agent 26 ranges from about 2.5 wt % to about 25 wt % based on the wt % of the plasmonic resonance absorber.

The fusing agent 26 may also include other additives, such as a chelating agent. The chelating agent may be included to eliminate the deleterious effects of heavy metal impurities. Examples of suitable chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fusing agent 26 may range from 0 wt % to about 2 wt % based on the total wt % of the fusing agent 26.

Still another suitable additive for the fusing agent 26 is a humectant and lubricant (e.g., LIPONIC® EG-1 (LEG-1) from Lipo Chemicals).

The balance of the fusing agent 26 is water or the non-aqueous solvent. As an example, deionized water may be used. As another example, suitable non-aqueous solvents include dimethyl sulfoxide (DMSO), ethanol, etc.

The applicator 24 may be scanned across the build area platform 12 in the direction indicated by the arrow 28, e.g., along the y-axis. The applicator 24 may be, for instance, a thermal inkjet printhead, a piezoelectric printhead, a continuous inkjet printhead, etc., and may extend a width of the build area platform 12. While the applicator 24 is shown in FIG. 1 as a single applicator, it is to be understood that the applicator 24 may include multiple applicators that span the width of the build area platform 12. Additionally, the applicators 24 may be positioned in multiple printbars. The applicator 24 may also be scanned along the x-axis, for instance, in configurations in which the applicator 24 does not span the width of the build area platform 12 to enable the applicator 24 to deposit the fusing agent 26 over a large area of a layer of polymeric or polymeric composite build material particles 16. The applicator 24 may thus be attached to a moving XY stage or a translational carriage (neither of which is shown) that moves the applicator 24 adjacent to the build area platform 12 in order to deposit the fusing agent 26 in predetermined areas of a layer of the polymeric or polymeric composite build material particles 16 that has been formed on the build area platform 12 in accordance with the method(s) disclosed herein. The applicator 24 may include a plurality of nozzles (not shown) through which the fusing agent 26 is to be ejected.

The applicator 24 may deliver drops of the fusing agent 26 at a resolution ranging from about 300 dots per inch (DPI) to about 1200 DPI. In other examples, the applicator 24 may deliver drops of the fusing agent 26 at a higher or lower resolution. The drop velocity may range from about 5 m/s to about 24 m/s and the firing frequency may range from about 1 kHz to about 100 kHz. In one example, each drop may be in the order of about 10 picoliters (pi) per drop, although it is contemplated that a higher or lower drop size may be used. In some examples, applicator 24 is able to deliver variable size drops of the fusing agent 26.

Each of the previously described physical elements may be operatively connected to a controller 30 of the printing system 10. The controller 30 may control the operations of the build area platform 12, the build material supply 14, the build material distributor 18, and the inkjet applicator 24. As an example, the controller 30 may control actuators (not shown) to control various operations of the 3D printing system 10 components. The controller 30 may be a computing device, a semiconductor-based microprocessor, a central processing unit (CPU), an application specific integrated circuit (ASIC), and/or another hardware device. Although not shown, the controller 30 may be connected to the 3D printing system 10 components via communication lines.

The controller 30 manipulates and transforms data, which may be represented as physical (electronic) quantities within the printer's registers and memories, in order to control the physical elements to create the 3D part 58. As such, the controller 30 is depicted as being in communication with a data store 32. The data store 32 may include data pertaining to a 3D part 58 to be printed by the 3D printing system 10. The data for the selective delivery of the polymeric or polymeric composite build material particles 16, the fusing agent 26, etc. may be derived from a model of the 3D part 58 to be formed. For instance, the data may include the locations on each layer of polymeric or polymer composite build material particles 16 that the applicator 24 is to deposit the fusing agent 26. In one example, the controller 30 may use the data to control the applicator 24 to selectively apply the fusing agent 26. The data store 32 may also include machine readable instructions (stored on a non-transitory computer readable medium) that are to cause the controller 30 to control the amount of polymeric or polymeric composite build material particles 16 that is supplied by the build material supply 14, the movement of the build area platform 12, the movement of the build material distributor 18, the movement of the applicator 24, etc.

As shown in FIG. 1, the printing system 10 may also include a source 34, 34' of electromagnetic radiation 54. In some examples, the source 34 of electromagnetic radiation 54 may be in a fixed position with respect to the build material platform 12. In other examples, the source 34' of electromagnetic radiation 54 may be positioned to apply electromagnetic radiation 54 (see FIG. 2C) to the layer of polymeric or polymeric composite build material particles 16 immediately after the fusing agent 26 has been applied thereto. In the example shown in FIG. 1, the source 34' of electromagnetic radiation 54 is attached to the side of the applicator 24, which allows for patterning and heating in a single pass.

The source 34, 34' of electromagnetic radiation 54 may be any suitable fusing lamp, examples of which include commercially available infrared (IR) lamps, flash lamps, and halogen lamps. Other examples of the source 34, 34' of electromagnetic radiation 54 may include xenon pulse lamps, IR lasers, etc.

In one example, the source 34, 34' of electromagnetic radiation 54 can be matched with an absorber in the fusing agent 26 so that the source 34, 34' of electromagnetic radiation 54 emits wavelengths of light that match the peak absorption wavelengths of the fusing agent 26. A fusing agent 26 with a narrow peak at a particular near-infrared wavelength can be used with a fusing lamp that emits a narrow range of wavelengths at approximately the peak wavelength of the fusing agent 26. Similarly, a fusing agent 26 that absorbs a broad range of near-infrared wavelengths can be used with a fusing lamp that emits a broad range of wavelengths. Matching the fusing agent 26 and the source 34, 34' of electromagnetic radiation 54 in this way can increase the efficiency of fusing the polymeric or polymeric composite build material 16 with the fusing agent 26 printed thereon, while the unprinted or unpatterned polymeric or polymeric composite build material particles 16 do not absorb as much radiation and remain at a lower temperature.

The source 34, 34' of electromagnetic radiation 54 may be operatively connected to a lamp/laser driver, an input/output temperature controller, and temperature sensors, which are collectively shown as radiation system components 36. The radiation system components 36 may operate together to control the source 34, 34' of electromagnetic radiation 54. The temperature recipe (e.g., radiation exposure rate) may be submitted to the input/output temperature controller. During heating, the temperature sensors may sense the temperature of the polymeric or polymeric composite build material particles 16, and the temperature measurements may be transmitted to the input/output temperature controller. For example, a thermometer associated with the heated area can provide temperature feedback. The input/output temperature controller may adjust the source 34, 34' of electromagnetic radiation 54 power set points based on any difference between the recipe and the real-time measurements. These power set points are sent to the lamp/laser drivers, which transmit appropriate lamp/laser voltages to the source 34, 34' of electromagnetic radiation 54. This is one example of the radiation system components 36, and it is to be understood that other radiation source control systems may be used. For example, the controller 30 may be configured to control the source 34, 34' of electromagnetic radiation 54.

The components of the printing system 10 may be used to form a 3D printed part. While system 10 is one example, it is to be understood that other 3D printing systems may be used to form the 3D printed parts that are used in the 3D part finishing system 11.

As shown in FIG. 1, the 3D part finishing system 11 includes a liquid supply 38 container, which is capable of containing the liquid 40 disclosed herein. As mentioned above, the liquid 40 may be selected from the group consisting of glycerin, avocado oil, almond oil, canola oil, and combinations thereof.

The liquid supply container 38 may be any container that is capable of containing the liquid 40 at a temperature that is above the melting point of the polymeric or polymeric composite build material 16 and below the boiling point of the liquid 40. In an example, the liquid supply container 38 of the liquid 40 may be able to withstand (i.e., be heated to without being damaged) temperatures ranging from about 200° C. to about 300° C. The liquid supply container 38 may be formed of ceramic, glass, metal, or a combination thereof. As an example, the liquid supply container 38 may be formed of a conductive metal, such as copper, aluminum, etc.

As shown in FIG. 1, the 3D part finishing system 11 may also include a submerging apparatus 42, which is capable of receiving the 3D printed part 58 (e.g., formed via printing system 10 or another 3D printing system). As one example, the submerging apparatus 42 may be a mesh structure into which the 3D printed part 58 may be placed so that when the submerging apparatus 42 is lowered into the liquid 40, the part 58 is forced into the liquid 40 but is able to move within the submerging apparatus 42. In this example, the ability of the part 58 to move within the submerging apparatus 42 may allow the part 58 to remain undamaged by the submerging apparatus 42. As another example, the submerging apparatus 42 may be a wire that wraps around the part 58 and can be used to lower the part 58 into the liquid 40. In still another example, the submerging apparatus 42 may be an open platform upon which the part 58 may be placed. The open platform may be porous in order to allow the liquid 40 to contact the portion of the part 58 in contact with the open platform. The open platform with the part 58 thereon may be lowered into the liquid 40. As still another example, the submerging apparatus 42 may be a mechanical claw that loosely holds the part 58 between several arms. The arms or fingers of the mechanical claw may be configured so that the part 58 can be held within the arms or fingers when forced into the liquid 40, and so that the part 58 can freely move within the arms or fingers. While several examples of the submerging apparatus have been provided, it is to be understood that any other submerging apparatus 42 that can at least partially immerse the part 58 into the liquid 40 may by used.

The submerging apparatus 42 should be able to withstand, tolerate, etc. the temperature of the liquid 40 in which it is immersed. In an example, the submerging apparatus 42 may be able to withstand temperatures ranging from about 200° C. to about 300° C., or higher. As examples, the submerging apparatus 42 may be formed of ceramic, metal, or a combination thereof. As another more specific example, the submerging apparatus 42 may be formed of a conductive metal, such as copper, aluminum, etc.

As shown in FIG. 1, the 3D part finishing system 11 may also include a heater 44 operatively connected to the controller 30 and to the liquid supply container 38. The controller 30 is capable of determining a temperature of the liquid 40 contained in the liquid supply container 38 based on a boiling point of the liquid 40 and a melting point of the fused polymeric or polymeric composite build material forming the 3D printed part 58. Any temperature between the liquid boiling point and the build material melting point may be used. In some instances, the controller 30 may determine that a temperature at the lower end of the range should be used. For example, when 3D part data indicates that the geometry of the part 58 includes fine or small features (e.g., walls, protruding sections, etc.), the controller 30 may determine that a temperature at the lower end of the range should be used. In some instances, the controller 30 may determine that a temperature at the higher end of the range should be used. For example, when 3D part data indicates that the geometry of the part 58 has larger surfaces without intricate or fine details (e.g., crevices, ridges, etc.), the controller 30 may determine that a temperature at the higher end of the range should be used.

The controller 30 is capable of controlling the heater 44 to heat the liquid 40 contained in the liquid supply container 38 to the determined temperature, which is below the boiling point of the liquid 40 and above the melting point of the fused polymeric or polymeric composite build material 16 forming the 3D printed part 58. In some examples, the heater 44 may be a conventional furnace or oven, a microwave, or devices capable of hybrid heating (i.e., conventional heating and microwave heating). The liquid supply container 38 of the liquid 40 may be placed in the heater 44 (not shown) or may be placed on the heater 44 (as shown in FIG. 1). In other examples, the liquid supply container 38 may have a built in heater 44.

As shown in FIG. 1, the 3D part finishing system 11 may also include a chiller 46 operatively connected to the controller 30. The controller 30 may be programmed to control a predetermined cooling temperature of the chiller 46 and to control introduction of the submerging apparatus 42, containing the 3D printed part 58, into the chiller 46 for a predetermined chilling time. The chiller 46 may be used to chill the 3D part 58 before it is submerged in the liquid 40. In some examples, the chiller 46 may be a conventional refrigerator or freezer.

It is to be understood that the controller 30 may be configured to control the liquid supply container 38 of the liquid 40, the submerging apparatus 42, the heater 44, and/or the chiller 46. For example, the system 11 may include the heater 44 and the chiller 46, and the controller 30 may cause the heater 44 to heat the liquid 40 to the determined temperature, and to cool the chiller 46 in order to chill the 3D part prior to submersion (of the 3D part 58 into the liquid 40).

The controller 30 may also control the submersion of the submerging apparatus 42 into the liquid supply container 38 for an input time. The input time may be received at the controller 30 from the 3D printing system 10 operatively connected thereto (e.g., from a separate controller of the system 10). In this example, the controller of the 3D printing system 10 may determine the input time based on the build material 16 of the 3D printed part and the part geometry, and may transmit this time to the controller 30 of the 3D part finishing system 11. The input time may also be determined by the controller 30 of the 3D part finishing system 11. In this example, the controller 30 determines the input time from a composition of the fused polymeric or polymeric composite build material 16 and a geometry of the 3D printed part 58.

Referring now to FIGS. 2A through 2G, an example of the 3D printing and part finishing method 100 is depicted. This method 100 may be used to form treated 3D printed parts 58' that are smooth, glossy, uniform in color, and/or an intended color (as compared to the 3D printed parts 58 prior to being submerged in the liquid 40).

Prior to execution of the method 100 or as part of the method 100, the controller 30 may access data stored in the data store 32 pertaining to a 3D part 58 that is to be printed. The controller 30 may determine the number of layers of polymeric or polymeric composite build material 16 that are to be formed, and the locations at which the fusing agent 26 from the applicator 24 is to be deposited on each of the respective layers.

As shown in FIGS. 2A and 2B, the method 100 includes applying the polymeric or polymeric composite build material 16. In FIG. 2A, the build material supply 14 may supply the polymeric or polymeric composite build material particles 16 into a position so that they are ready to be spread onto the build area platform 12. In FIG. 2B, the build material distributor 18 may spread the supplied polymeric or polymeric composite build material particles 16 onto the build area platform 12. The controller 30 (not shown in FIG. 2B) may execute control build material supply instructions to control the build material supply 14 to appropriately position the polymeric or polymeric composite build material particles 16, and may execute control spreader instructions to control the build material distributor 18 to spread the supplied polymeric or polymeric composite build material particles 16 over the build area platform 12 to form a layer 48 of polymeric or polymeric composite build material particles 16 thereon. As shown in FIG. 2B, one layer 48 of the polymeric or polymeric composite build material particles 16 has been applied.

The layer 48 has a substantially uniform thickness across the build area platform 12. In an example, the thickness of the layer 48 is about 100 µm. In another example, the thickness of the layer 48 ranges from about 50 µm to about 300 µm, although thinner or thicker layers may also be used. For example, the thickness of the layer 48 may range from about 20 µm to about 500 µm, or from about 30 µm to about 300 µm. The layer thickness may be about 2× (i.e., 2 times) the particle diameter (as shown in FIG. 2B) at a minimum for finer part definition. In some examples, the layer thickness may be about 1.2× the particle diameter.

Prior to further processing, the layer 48 of the polymeric or polymeric composite build material particles 16 may be exposed to heating. Heating may be performed to pre-heat the polymeric or polymeric composite build material particles 16, and thus the heating temperature may be below the melting point or softening point of the polymeric or polymeric composite build material particles 16. As such, the temperature selected will depend upon the polymeric or polymeric composite build material particles 16 that are used. As examples, the pre-heating temperature may be from about 5° C. to about 50° C. below the melting point or softening point of the polymeric or polymeric composite build material particles 16. In an example, the pre-heating temperature ranges from about 50° C. to about 250° C. In another example, the pre-heating temperature ranges from about 150° C. to about 170° C.

Pre-heating the layer 48 of the polymeric or polymeric composite build material particles 16 may be accomplished using any suitable heat source that exposes all of the polymeric or polymeric composite build material particles 16 on the build material surface 12 to the heat. Examples of the heat source include a thermal heat source (e.g., a heater (not shown) of the particles 16) or the electromagnetic radiation source 34, 34'.

Referring now to FIG. 2C, after the layer 48 is formed, and in some instances is pre-heated, the fusing agent 26 is selectively applied on at least a portion 50 of the polymeric or polymeric composite build material 16.

It is to be understood that a single fusing agent 26 may be selectively applied on the portion 50, or multiple fusing agents 26 may be selectively applied on the portion 50. As an example, multiple fusing agents 26 may be used to create a multi-colored part.

As illustrated in FIG. 2C, the fusing agent 26 may be dispensed from the applicator 24. The applicator 24 may be a thermal inkjet printhead, a piezoelectric printhead, etc., and the selectively applying of the fusing agent 26 may be accomplished by the associated inkjet printing technique. The fusing agent 26 may be dispensed at a contone level ranging from about 10 contone to about 255 contone (which refers to the number of drops, which is divided by 256, that will be placed on average onto each pixel).

The controller 30 may process data, and in response control the applicator 24 (e.g., in the directions indicated by the arrow 28) to deposit the fusing agent 26 onto predetermined portion(s) 50 of the polymeric or polymeric composite build material 16 that are to become part of the 3D part 58. The applicator 24 may be programmed to receive commands from the controller 30 and to deposit the fusing agent 26 according to a pattern of a cross-section for the layer of the 3D part to be formed. As used herein, the cross-section of the layer of the 3D part to be formed refers to the cross-section that is parallel to the surface of the build area platform 12. In the example shown in FIG. 2C, the applicator 24 selectively applies the fusing agent 26 on those portion(s) 50 of the layer 48 that are to be fused to become the first layer of the 3D part 58. As an example, if the 3D part that is to be formed is to be shaped like a cube or cylinder, the fusing agent 26 will be deposited in a square pattern or a circular pattern (from a top view), respectively, on at least a portion of the layer 48 of the polymeric or polymeric composite build material particles 16. In the example shown in FIG. 2C, the fusing agent 26 is deposited in a square pattern on the portion 50 of the layer 48 and not on the portions 52.

As mentioned above, the fusing agent 26 may include the active material and the FA vehicle. The volume of the fusing agent 26 that is applied per unit of the polymeric or polymeric composite build material 16 in the patterned portion 50 may be sufficient to absorb and convert enough electromagnetic radiation 54 so that the polymeric or polymeric composite build material 16 in the patterned portion 50 will fuse. The volume of the fusing agent 26 that is applied per unit of the polymer or polymeric composite build material 16 may depend, at least in part, on the active material used, the active material loading in the fusing agent 26, and the polymeric or polymeric composite build material 16 used.

After selectively applying the fusing agent 26, electromagnetic radiation 54 is applied to the polymeric or polymeric composite build material 16. The electromagnetic radiation 54 may be applied with the source 34 of electromagnetic radiation 54 as shown in FIG. 2D or with the source 34' of electromagnetic radiation 54 as shown in FIG. 2C.

The fusing agent 26 enhances the absorption of the electromagnetic radiation 54, converts the absorbed electromagnetic radiation 54 to thermal energy, and promotes the transfer of the thermal heat to the polymeric or polymeric composite build material particles 16 in contact therewith. In an example, the fusing agent 26 sufficiently elevates the temperature of the polymeric or polymeric composite build material particles 16 in layer 48 above the melting or softening point of the particles 16, allowing fusing (e.g., sintering, binding, curing, etc.) of the polymeric or polymeric composite build material particles 16 to take place. The application of the electromagnetic radiation 54 forms the fused layer 56, as shown in FIG. 2D.

It is to be understood that portions 52 of the polymeric or polymeric composite build material 16 that do not have the fusing agent 26 applied thereto do not absorb enough radiation 54 to fuse. As such, these portions 52 do not become part of the 3D part 58 that is ultimately formed. The polymeric or polymeric composite build material 16 in portions 52 may be reclaimed to be reused as build material in the printing of another 3D part.

The processes shown in FIGS. 2A through 2D may be repeated to iteratively build up several fused layers and to form the 3D printed part 58. FIG. 2E illustrates the initial formation of a second layer of polymeric or polymeric composite build material particles 16 on the previously formed layer 56. In FIG. 2E, following the fusing of the predetermined portion(s) 50 of the layer 48 of polymeric or polymeric composite build material 16, the controller 30 may execute instructions to cause the build area platform 12 to be moved a relatively small distance in the direction denoted by the arrow 20. In other words, the build area platform 12 may be lowered to enable the next layer of polymeric or polymeric composite build material particles 16 to be formed. For example, the build material platform 12 may be lowered a distance that is equivalent to the height of the layer 48. In addition, following the lowering of the build area platform 12, the controller 30 may control the build material supply 14 to supply additional polymeric or polymeric composite build material particles 16 (e.g., through operation of an elevator, an auger, or the like) and the build material distributor 18 to form another layer of polymeric or polymeric composite build material particles 16 on top of the previously formed layer with the additional polymeric or polymeric composite build material 16. The newly formed layer may be in some instances pre-heated, patterned with the fusing agent 26, and then exposed to electromagnetic radiation 54 from the source 34, 34' of electromagnetic radiation 54 to form the additional fused layer.

Figure 2G:
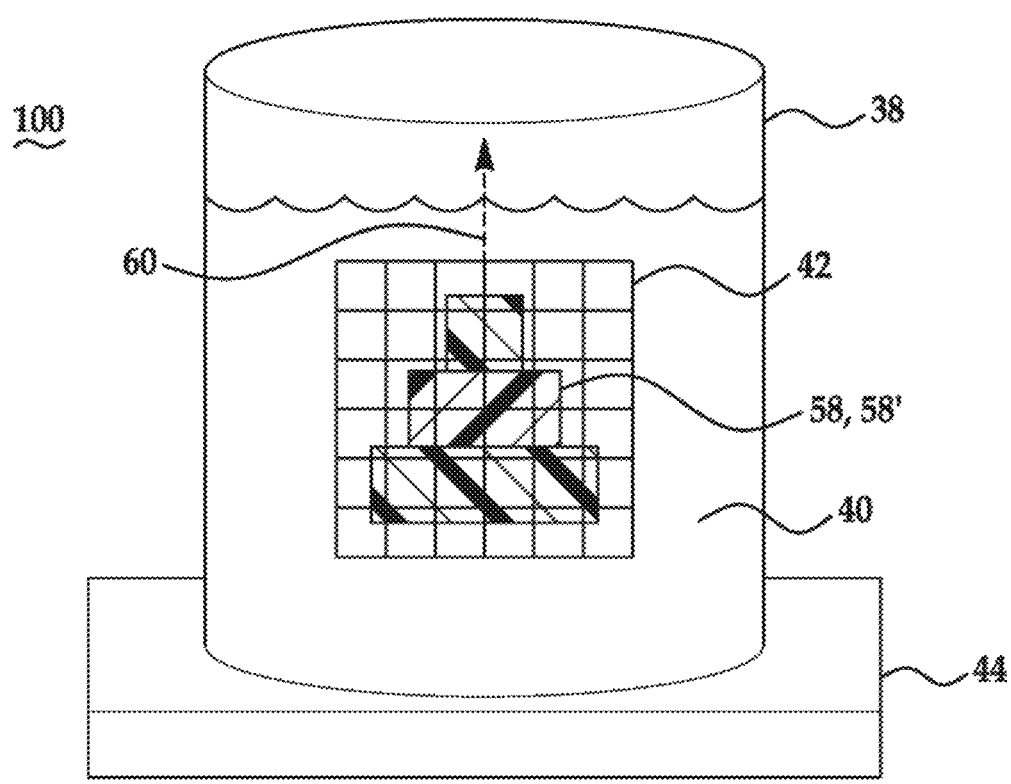

In some examples after the 3D part 58 is formed, the method 100 continues with the processes shown in FIG. 2F and then FIG. 2G. In other examples after the 3D part 58 is formed, the method 100 continues directly to FIG. 2G. As such, FIG. 2G will be described first, and FIG. 2F will be described thereafter.

Referring now to FIG. 2G, after the 3D part 58 is formed, the 3D part 58 is at least partially submerged into the liquid 40. Submerging the part 58 forms the treated part 58'. In an example, submerging the 3D part 58 causes the 3D part 58 to become: smooth; glossy; uniform in color; an intended color; or a combination thereof.

The submerging of 3D part 58 into the liquid 40 involves the submerging apparatus 42, as shown in FIG. 2G. As mentioned above, the submerging apparatus 42 may be a mesh structure into which the 3D printed part 58 may be placed so that when the submerging apparatus 42 is lowered into the liquid 40, the part 58 is forced into the liquid 40 but is also able to move within the submerging apparatus 42. The submerging apparatus 42 keeps the 3D part in the liquid 40, and allows the entire surface of the 3D part to be simultaneously exposed to the liquid 40.

It is to be understood that the submerging of the 3D part 58 in the liquid 40 involves partial submerging of the 3D part 58 or complete submerging of the 3D part 58. The 3D part 58 may be partially submerged in the liquid 40 by dipping the section to be submerged into the liquid 40 and holding the section not to be submerged out of the liquid 40. Partial submersion of the 3D part 58 may be utilized when it is not desirable for a section of the part 58 (e.g., the bottom section or the back section) to be smooth, glossy, uniform in color, and/or the intended color (e.g., it is desirable for a portion to be black and for another portion to be grey). For partial submersion, the submerging apparatus may be a set of tongs or other device that can hold the part 58 so that a portion is submerged and a portion is not submerged. As mentioned above, the 3D part 58 may be completely submerged in the liquid 40 with the submerging apparatus 42 (as shown in FIG. 2G). Complete submersion of the 3D part 58 may be utilized when it is desirable for all of the part 58 to be smooth, glossy, uniform in color, and/or the intended color.

The submerging of the 3D part 58 in the liquid 40 takes place for a predetermined amount of time (i.e., the input time). In some examples, the predetermined amount of time may depend on the composition of the fused polymeric or polymeric composite build material 16 and the geometry of the 3D printed part 58. In other examples, the predetermined amount of time may depend, at least in part, on polymeric or polymeric composite build material 16 used, the temperature of the liquid 40, and/or the geometry of the part 58. For example, if the polymeric or polymeric composite build material 16 used has a high melting point, the temperature of the liquid 40 is close to (e.g., within 5° C. of) the melting point of the polymeric or polymeric composite build material 16 used, and/or the geometry of the part 58 is simple (e.g., the geometry does not contain thin portions or small details), the predetermined amount of time may be longer (e.g., 5 seconds). As another example, if the polymeric or polymeric composite build material 16 used has a low melting point, the temperature of the liquid 40 is substantially higher (e.g., 50° C. higher) than the melting point of the polymeric or polymeric composite build material 16 used, and/or the geometry of the part 58 is complex (e.g., the geometry does contain thin portions or small details), the predetermined amount of time may be shorter (e.g., 0.25 seconds).

In an example, the predetermined amount of time is brief enough that the features of the part 58 (and thus the treated part 58') are not distorted. As an example, the predetermined amount of time is 6 seconds or less. As another example, the predetermined amount of time is 0.10 seconds or less, or 0.05 seconds or less. In still another example, the predetermined amount of time ranges from about 0.25 seconds to about 5 seconds.

The controller 30 may process data regarding the input time (i.e., the predetermined amount of time for submersion), and in response may control the submerging apparatus 42, and, in particular, may control the predetermined amount of time that the 3D part 58 is submerged in the liquid 40. The controller 30 may receive inputted information pertaining to the type/composition of polymeric or polymeric composite build material 16, the temperature of the liquid 40, and/or the geometry of the part 58, and may utilize the input information to determine how long the 3D part 58 will be submerged. Alternatively, a controller of the printing system 10 may calculate the input time, and may transmit this information to the controller of the part finishing system 11.

The temperature of the liquid 40 when the 3D part 58 is submerged therein is above the melting point of the polymeric or polymeric composite build material 16 and below the boiling point of the liquid 40. As such, the temperature of the liquid 40 will depend, at least in part, on the polymeric or polymeric composite build material 16 used and on the liquid 40 used. When determining the temperature of the liquid 40, the controller 30 may identify a temperature range between the boiling point of the liquid 40 and the melting point of the fused polymeric or polymeric composite build material 16; and may select the determined temperature (for the liquid 40) from within the temperature range based on the characteristic of the 3D printed part, the input time, or combinations thereof. As such, the temperature of the liquid 40 may also depend, in part, on the amount of time for which the 3D part 58 is submerged and/or the geometry of the part 58, 58'. For example, if the amount of time for which the 3D part 58 is submerged is short (e.g., 0.25 seconds) and/or the geometry of the part 58 is simple (e.g., the geometry does not contain thin portions or small details), the temperature of the liquid 40 may be substantially higher (e.g., 50° C. higher) than the melting point of the polymeric or polymeric composite build material 16 used. As another example, if the amount of time for which the 3D part 58 is submerged is long (e.g., 5 seconds) and/or the geometry of the part 58 is complex (e.g., the geometry does contain thin portions or small details), the temperature of the liquid 40 may be close to (e.g., within 5° C. of) the melting point of the polymeric or polymeric composite build material 16 used.

The following are examples of the temperature of the liquid 40 during submersion. In an example, the temperature of the liquid 40 ranges from about 200° C. to about 300° C. In another example, the temperature of the liquid 40 ranges from about 250° C. to about 280° C. In still another example, the temperature of the liquid 40 ranges from 1° C. higher than the melting point of the polymeric or polymeric composite build material 16 to 50° C. higher than the melting point of the polymeric or polymeric composite build material 16. In still another example, the temperature of the liquid 40 ranges from 1° C. higher than the melting point of the polymeric or polymeric composite build material 16 to 5° C. higher than the melting point of the polymeric or polymeric composite build material 16.

As mentioned herein, the temperature of the liquid 40 and the predetermined time for which the 3D part 58 is submerged are dependent upon one another. For example, an estimate of the temperature (° C.) distribution as a function of time for part 58 exposure to the liquid (s, columns) and position within the part 58 (mm, as measured from the part surface, rows), for a part 58 formed from polyamide-12 (PA-12) (melting point of 181.5 and glass transition temperature ($T_g$) of 160° C.), with an initial temperature of 23° C., and submerged in the liquid 40 when the temperature of the liquid 40 is 230° C., is shown in Table 1 below. The temperatures shown in italics correspond to sections of the part 58 that have melted. The temperatures shown underlined correspond to sections of the part 58 that have reached the $T_g$ of the polymer (PA-12) from which the part 58 was formed, and the unshaded temperatures correspond to sections of the part 58 that remain solid.

TABLE 1

| Distance (mm) | Time (s) | | | | | | | | | |
|---|---|---|---|---|---|---|---|---|---|---|
| | 0.01 s | 0.02 s | 0.05 s | 0.10 s | 0.20 s | 0.50 s | 1.00 s | 2.00 s | 5.00 s | 10.00 s |
| | Temperature (° C.) as function of time and distance from part surface | | | | | | | | | |
| 0.00 mm | *230.0* | *230.0* | *230.0* | *230.0* | *230.0* | *230.0* | *230.0* | *230.0* | *230.0* | *230.0* |
| 0.05 mm | 100.3 | 132.8 | <u>166.2</u> | *184.4* | *197.5* | *209.4* | *215.4* | *219.7* | *223.5* | *225.4* |
| 0.10 mm | 37.6 | 65.6 | 11.3 | 142.0 | <u>166.2</u> | *189.1* | *200.9* | *209.4* | *216.9* | *220.8* |
| 0.15 mm | 24.2 | 34.3 | 70.7 | 105.6 | 137.2 | <u>169.4</u> | *186.7* | *199.2* | *210.4* | *216.2* |
| 0.20 mm | 23.0 | 24.9 | 45.2 | 76.6 | 111.3 | 150.5 | <u>172.7</u> | *189.1* | *204.0* | *211.6* |
| 0.25 mm | 23.0 | 23.2 | 31.8 | 55.3 | 89.1 | 132.8 | 159.2 | <u>179.1</u> | *197.5* | *207.0* |
| 0.30 mm | 23.0 | 23.0 | 25.9 | 41.0 | 70.7 | 116.3 | 146.1 | <u>169.4</u> | *191.1* | *202.4* |
| 0.35 mm | 23.0 | 23.0 | 23.0 | 32.2 | 56.2 | 101.3 | 133.7 | 159.8 | *184.8* | *197.9* |
| 0.40 mm | 23.0 | 23.0 | 23.2 | 27.3 | 45.2 | 87.9 | 121.8 | 150.5 | <u>178.5</u> | *193.3* |
| 0.50 mm | 23.0 | 23.0 | 23.0 | 23.7 | 31.8 | 65.6 | 100.3 | 132.8 | <u>166.2</u> | *184.4* |
| 0.60 mm | 23.0 | 23.0 | 23.0 | 23.1 | 25.9 | 49.3 | 81.9 | 116.3 | 154.3 | <u>175.5</u> |
| 0.70 mm | 23.0 | 23.0 | 23.0 | 23.0 | 23.8 | 38.2 | 66.6 | 101.3 | 142.8 | <u>166.9</u> |
| 0.80 mm | 23.0 | 23.0 | 23.0 | 23.0 | 23.2 | 31.2 | 54.3 | 87.9 | 131.8 | 158.4 |
| 0.90 mm | 23.0 | 23.0 | 23.0 | 23.0 | 23.0 | 27.1 | 44.7 | 75.9 | 121.3 | 150.1 |
| 1.00 mm | 23.0 | 23.0 | 23.0 | 23.0 | 23.0 | 24.9 | 37.6 | 65.6 | 111.3 | 142.0 |
| 1.20 mm | 23.0 | 23.0 | 23.0 | 23.0 | 23.0 | 23.3 | 29.0 | 49.3 | 93.2 | 126.6 |
| 1.40 mm | 23.0 | 23.0 | 23.0 | 23.0 | 23.0 | 23.0 | 25.1 | 38.2 | 77.6 | 112.3 |
| 1.60 mm | 23.0 | 23.0 | 23.0 | 23.0 | 23.0 | 23.0 | 23.6 | 31.2 | 64.5 | 99.1 |
| 1.80 mm | 23.0 | 23.0 | 23.0 | 23.0 | 23.0 | 23.0 | 23.2 | 27.1 | 53.7 | 87.2 |
| 2.00 mm | 23.0 | 23.0 | 23.0 | 23.0 | 23.0 | 23.0 | 23.0 | 24.9 | 45.2 | 76.6 |

As another example, an estimate of the temperature (° C.) distribution as a function of time for part 58 exposure to the liquid (s, columns) and position within the part 58 (mm, as measured from the part surface, rows), for a part 58 formed from PA-12 (melting point of 181.5 and $T_g$ of 160° C.), with an initial temperature of 23° C., and submerged in the liquid 40 when the temperature of the liquid 40 is 500° C., is shown in Table 2 below. The temperatures shown in italics correspond to sections of the part 58 that have melted. The temperatures shown underlined correspond to sections of the part 58 that have reached the $T_g$ of the polymer (PA-12) from which the part 58 was formed, and the unshaded temperatures correspond to sections of the part 58 that remain solid.

minimum possible feature size of at least 0.20 mm, all surfaces of the part 58 will contact the liquid 40 during complete submersion. The printer-dictated minimum feature size may be used by the controller 30 to determine the maximum duration that the part 58 (whose minimum feature size is equal to or greater than the printer-dictated minimum feature size) can be submerged. As such, in this example, the maximum duration may be based on the minimum possible feature size, and may not take into account the actual minimum feature sizes of the 3D part 58. As an example, the controller 30 may first identify a distance from the part surface that is smaller than the minimum possible feature size (e.g., ½ the minimum possible feature size=identified

TABLE 2

| Distance (mm) | Time (s) | | | | | | | | | |
|---|---|---|---|---|---|---|---|---|---|---|
| | 0.01 s | 0.02 s | 0.05 s | 0.10 s | 0.20 s | 0.50 s | 1.00 s | 2.00 s | 5.00 s | 10.00 s |
| | Temperature (° C.) as function of time and distance from part surface | | | | | | | | | |
| 0.00 mm | *500.0* | *500.0* | *500.0* | *500.0* | *500.0* | *500.0* | *500.0* | *500.0* | *500.0* | *500.0* |
| 0.05 mm | *201.2* | *276.0* | *353.1* | *394.8* | *425.2* | *452.5* | *466.4* | *476.2* | *484.9* | *489.4* |
| 0.10 mm | 56.7 | 121.1 | *226.5* | *297.2* | *353.1* | *405.7* | *433.0* | *452.5* | *469.9* | *478.7* |
| 0.15 mm | 25.7 | 49.0 | 132.9 | *213.3* | *286.2* | *360.3* | *400.1* | *429.0* | *454.9* | *468.1* |
| 0.20 mm | 23.1 | 27.4 | 74.2 | 146.4 | *226.5* | *316.9* | *368.0* | *405.7* | *440.0* | *457.5* |
| 0.25 mm | 23.0 | 23.5 | 29.6 | 97.4 | <u>175.2</u> | *276.0* | *336.8* | *382.8* | *425.2* | *446.9* |
| 0.30 mm | 23.0 | 23.0 | 24.8 | 64.5 | 132.9 | *238.1* | *306.7* | *360.3* | *410.5* | *436.4* |
| 0.35 mm | 23.0 | 23.0 | 23.4 | 44.2 | 99.5 | *203.5* | *278.0* | *338.3* | *395.9* | *425.9* |
| 0.40 mm | 23.0 | 23.0 | 23.0 | 32.9 | 74.2 | <u>172.5</u> | *250.7* | *316.9* | *381.4* | *415.5* |
| 0.50 mm | 23.0 | 23.0 | 23.0 | 24.6 | 43.2 | 121.1 | *201.2* | *276.0* | *353.1* | *394.8* |
| 0.60 mm | 23.0 | 23.0 | 23.0 | 23.2 | 29.6 | 83.6 | 158.7 | *238.1* | *325.6* | *374.5* |
| 0.70 mm | 23.0 | 23.0 | 23.0 | 23.0 | 24.8 | 58.1 | 123.4 | *203.5* | *299.1* | *354.5* |
| 0.80 mm | 23.0 | 23.0 | 23.0 | 23.0 | 23.4 | 42.0 | 95.0 | <u>172.5</u> | *273.7* | *334.9* |
| 0.90 mm | 23.0 | 23.0 | 23.0 | 23.0 | 23.1 | 32.5 | 73.1 | 145.0 | *249.4* | *315.8* |
| 1.00 mm | 23.0 | 23.0 | 23.0 | 23.0 | 23.0 | 27.4 | 56.7 | 121.1 | *226.5* | *297.2* |
| 1.20 mm | 23.0 | 23.0 | 23.0 | 23.0 | 23.0 | 23.8 | 36.7 | 83.6 | *184.8* | *261.7* |
| 1.40 mm | 23.0 | 23.0 | 23.0 | 23.0 | 23.0 | 23.1 | 27.8 | 58.1 | 148.8 | *228.7* |
| 1.60 mm | 23.0 | 23.0 | 23.0 | 23.0 | 23.0 | 23.0 | 24.5 | 42.0 | 118.5 | *198.5* |
| 1.80 mm | 23.0 | 23.0 | 23.0 | 23.0 | 23.0 | 23.4 | 32.5 | 93.8 | <u>171.0</u> | |
| 2.00 mm | 23.0 | 23.0 | 23.0 | 23.0 | 23.0 | 23.0 | 23.1 | 27.4 | 74.2 | 146.4 |

In an example, the controller 30 may be programmed to know the minimum part feature size that is capable of being printed by the 3D printing system 10 that generates the 3D printed part 58 that is to be at least partially submerged. The controller 30 may also be programmed to know that at a distance). The controller 30 may then utilize a look up table (similar to that shown in Table 1 or Table 2) to determine a submersion time that leads to melting of the part at the identified distance (which is smaller than the minimum possible feature size). As a specific example using Table 1, when the minimum possible feature size to be generated by the printing system 10 is 0.20 mm, the controller 30 may identify 0.10 mm as a suitable distance from the part surface and 0.5 seconds as a suitable maximum duration. As shown in Table 1, the temperature for the minimum possible feature size, e.g., 0.20 mm, at 0.5 seconds does not result in melting, and thus is a suitable submersion time for the 3D part 58.

In another example, the controller 30 may receive information (e.g., input by a system 11 user, received from the 3D printing system 10, etc.) regarding the minimum feature size of the 3D printed part 58 that is to be at least partially submerged. The actual minimum feature size of the 3D printed part 58 may be used by the controller 30 to determine the maximum duration that the part 58 can be submerged. As an example, the controller 30 may first identify a distance from the part surface that is smaller than the actual minimum feature size (e.g., ½ the actual minimum feature size=identified distance). The controller 30 may then utilize a look up table (similar to that shown in Table 1 or Table 2) to determine a submersion time that leads to melting of the part at the identified distance (which is smaller than the minimum possible feature size). As a specific example using Table 1, when the actual minimum feature size of the 3D printed part is 0.60 mm, the controller 30 may identify 0.30 mm as the distance from the part surface and 5 seconds as a suitable maximum duration. As shown in Table 1, the temperature for 0.60 mm at 5 seconds does not result in melting and thus is a suitable submersion time.

In the previous examples, the controller 30 either determines a maximum duration (for submerging) using the minimum possible feature size of the printing system 10 or adjusts the duration based on the actual minimum feature size of the 3D printed part.

Prior to the submerging of the 3D part 58 into the liquid 40, some examples of the method 100 include heating the liquid 40 to the temperature. Heating the liquid 40 to the temperature may be accomplished with the heater 44, as shown in FIG. 2G. The liquid 40 may be pre-heated and maintained at the desired temperature, or may be heated just prior to the 3D part 58 being submerged therein.

Some examples of the method 100 further include removing the treated part 58' from the liquid 40, and then washing the treated part 58' with water. To remove the treated part 58' from the liquid 40, the submerging apparatus 42 may be lifted out of the liquid 40 in a direction as denoted by the arrow 60, e.g., along the z-axis as shown in FIG. 2G. After the treated part 58' is removed from the liquid 40 and/or the submerging apparatus 42, the treated part 58' may be washed with water (e.g., by spraying) or quenched in cold water. A water wash or quench may remove residual liquid 40 from the treated part 58'. The water wash or quench may also cool the treated part 58 and/or prevent further melting of the treated part 58' from occurring.

Referring back to FIG. 2F, some examples of the method 100 include chilling the 3D part 58 prior to submerging the 3D part in the liquid 40. Chilling the 3D part 58 prior to submerging the 3D part 58 in the liquid 40 may create a larger thermal gradient across the part surface than there would be if the 3D part 58 was at room temperature (e.g., 18° C. to 25° C.) prior to being submerged in the liquid 40. The larger thermal gradient across the part surface may reduce the potential that smaller features of the part 58 will be become distorted or removed during submersion.

In an example, prior to the submerging of the 3D part 58 into the liquid 40, the method 100 may include chilling the 3D part 58 at a temperature ranging from about −50° C. to about 0° C. for a time period ranging from 1 minute to 60 minutes. However, it is contemplated that the 3D part 58 may be chilled at a temperature lower than −50° C. and/or for less than 1 minute or for more than 60 minutes. For example, if the geometry of the 3D part 58 contains thick portions, the 3D part 58 may be chilled at a temperature lower than −50° C. and/or for longer than 60 minute. Alternatively, if an extremely cold liquid is used, the part 58 may be dipped in the liquid for less than 1 minute.

Chilling may take place by soaking or dipping the part 58 in a cold liquid (e.g., liquid nitrogen, chilled water, etc.), or by placing the part 58 in a refrigerator or freezer set at the desired temperature.

Figure 3B:
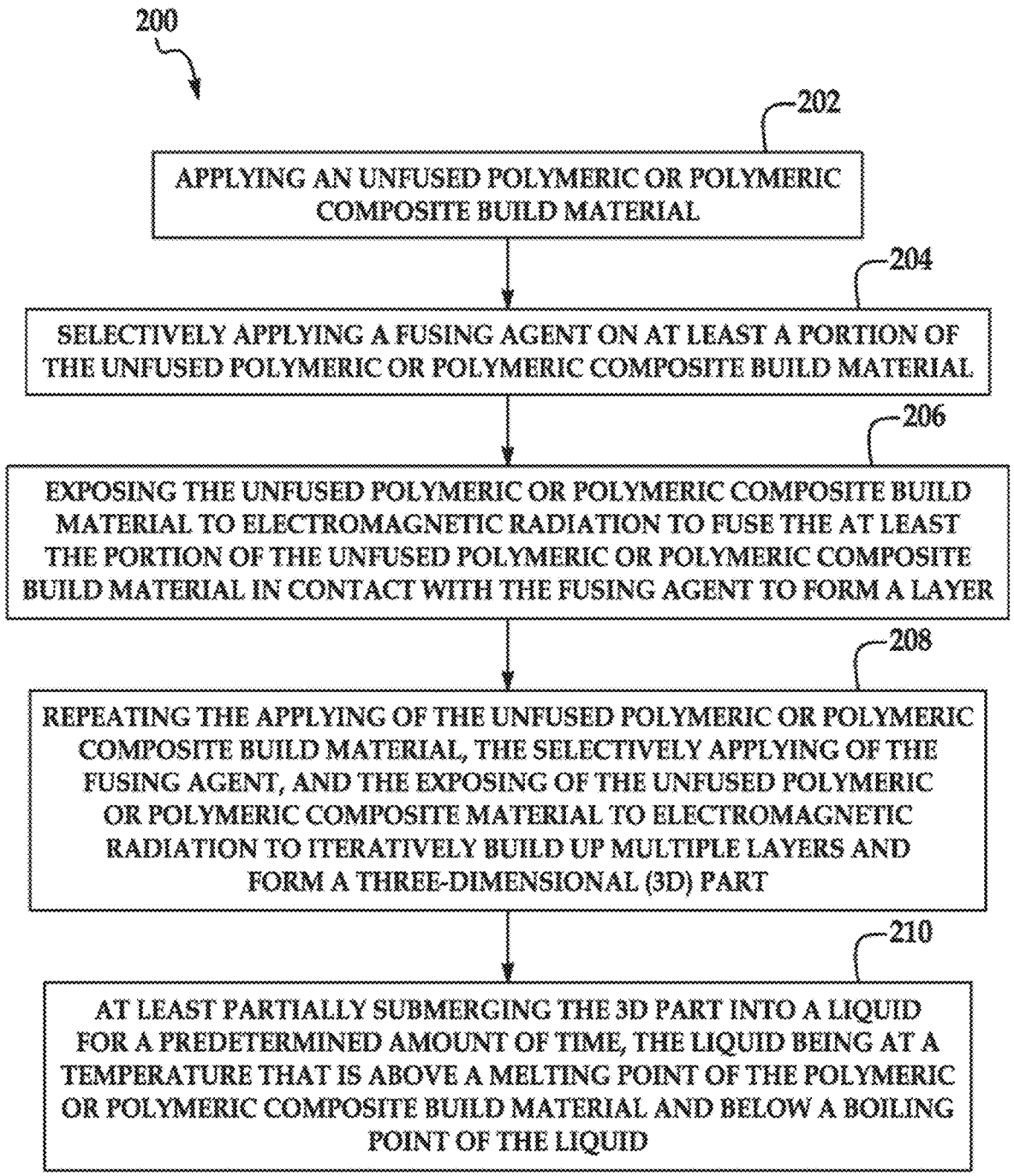
FIG. 3B is a flow diagram illustrating an example of a 3D printing and finishing method disclosed herein.

An example of the 3D printing and finishing method 200 is depicted in FIG. 3B. It is to be understood that examples of the method 200 shown in FIG. 3B are discussed in detail herein, e.g., in FIGS. 2A-2G and the text corresponding thereto.

As shown at reference numeral 202, the method 200 includes applying the unfused polymeric or polymeric composite build material 16.

As shown at reference numeral 204, method 200 further includes selectively applying the fusing agent 26 on at least a portion 50 of the unfused polymeric or polymeric composite build material 16.

As shown at reference numeral 206, method 200 further includes exposing the unfused polymeric or polymeric composite build material 16 to electromagnetic radiation 54 to fuse the at least the portion 50 of the unfused polymeric or polymeric composite build material 16 in contact with the fusing agent 26 to form a layer 56.

As shown at reference numeral 208, method 200 further includes repeating the applying of the unfused polymeric or polymeric composite build material 16, the selectively applying of the fusing agent 26, and the exposing of the unfused polymeric or polymeric composite build material 16 to electromagnetic radiation 54 to iteratively build up multiple layers and form a three-dimensional (3D) part 58.

As shown at reference numeral 210, method 200 further includes at least partially submerging the 3D part 58 into a liquid 40 for a predetermined amount of time, the liquid 40 being at a temperature that is above a melting point of the polymeric or polymeric composite build material 16 (used to form the part 58) and below a boiling point of the liquid 40.

To further illustrate the present disclosure, an example is given herein. It is to be understood that this example is provided for illustrative purposes and is not to be construed as limiting the scope of the present disclosure.

Example

An example part was printed using polyamide-12 (PA-12) as the build material and a black fusing agent containing carbon black pigment. As each layer of powder was applied and patterned with the fusing agent, it was exposed to near-IR radiation using 1800K and 2700K quartz infrared halogen lamps. The resulting part had 35 layers. The example part was printed in the shape of a dog bone and was a grey color.

About 30 mm of the example part was submerged in glycerin for 5 seconds. The temperature of the glycerin at the time of submersion was 250° C. The initial temperature of the example part just before submersion was 23° C. The treated section of the part was smooth, glossy, and exhibited a uniform black color.

Figure 4:
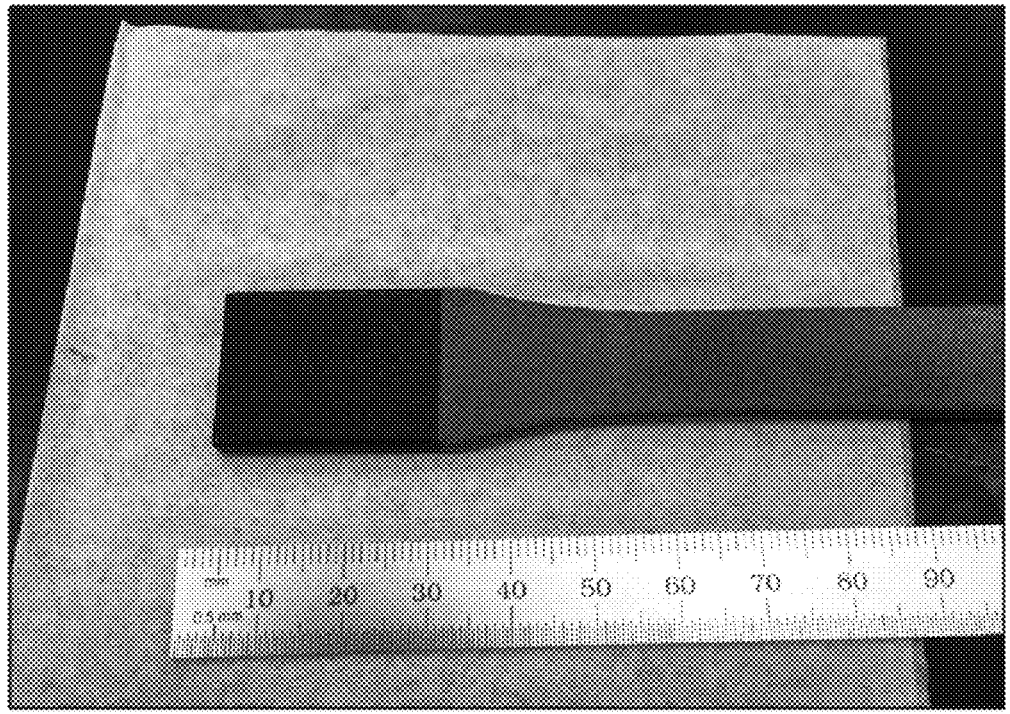
FIG. 4 is a black and white photograph showing a treated 3D part formed by an example of the method disclosed herein.

The treated example part is shown in FIG. 4. The left most portion (about 30 mm in length) of the example part is the section of the part that was submerged in the glycerin. The remainder of the example part (right section) was not submerged. As shown in FIG. 4, the left section of the example part is smooth, glossy, and exhibits a uniform black color (as compared to the unsubmerged section), and the right section of the part is rough and grey (as compared to the section that was submerged).

In this example, the intended color of the example part was black, and prior to submersion, the example part was a grey color. The portion of the example part after submersion was closer to the intended black color. The color difference is shown in FIG. 4, and was confirmed by measuring the lightness (i.e., L*) of both sections of the example part. The L* of left section was 22 (closer to the L* of black, i.e., 0), and the L* of the right section was 37 (further from the L* of black). The grey color prior to submersion was likely to due to presence of unfused build material at the surface, which lightened the color of the fused build material. Upon submersion, the color significantly darkened, and was much closer to the intended black color. This was likely due to the exterior surface of the part melting and encapsulating the unfused white build material.

The surface roughness ($R_a$) of the example part was measured before and after submission, and the maximum deviation ($R_z$) of the surface roughness was calculated. The 20° gloss of the example part was also measured before and after submission. The results are shown in Table 3.

TABLE 3

|  | Before Treatment | After Treatment |
|---|---|---|
| $R_a$ (ave roughness) | 5 | 0.7 |
| $R_z$ (max deviation) | 24 | 3 |
| 20° Gloss | 0.2 | 1.2 |

As depicted, there was about a 7 times reduction in the average surface roughness and an 8 times reduction in the maximum roughness deviation for the example part after the treatment. Moreover, there was a 6 times improvement in the 20° gloss of the treated portion of the part, compared to the part before treatment.

It is to be understood that the ranges provided herein include the stated range and any value or sub-range within the stated range. For example, a range from about 200° C. to about 300° C. should be interpreted to include the explicitly recited limits of from about 200° C. to about 300° C., and also to include individual values, such as 235.5° C., 255° C., 275° C., 280.85° C., etc., and sub-ranges, such as from about 235° C. to about 260.5° C., from about 220.5° C. to about 270.7° C., from about 215° C. to about 281° C., etc. Furthermore, when "about" or the symbol "~" is utilized to describe a value, this is meant to encompass minor variations (up to +/−15%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) part finishing system, comprising:
    a submerging apparatus to receive a 3D printed part;
    a liquid supply container to removably receive the submerging apparatus; and
    a controller operatively connected to the submerging apparatus, the controller to receive or determine an input time for the 3D printed part and to control submersion of the submerging apparatus into the liquid supply container for the input time.

2. The 3D part finishing system as defined in claim 1 wherein the controller is to determine a temperature of a liquid contained in the liquid supply container based on a boiling point of the liquid and a melting point of a fused polymeric or polymeric composite build material forming the 3D printed part.

3. The 3D part finishing system as defined in claim 1, further comprising a heater operatively connected to the controller and to the liquid supply container, the controller to heat the liquid contained in the liquid supply container to the determined temperature.

4. The 3D part finishing system as defined in claim 1, further comprising a chiller operatively connected to the controller, the controller to control a predetermined cooling temperature of the chiller and to control introduction of the submerging apparatus, containing the 3D printed part, into the chiller for a predetermined chilling time.

5. The 3D part finishing system as defined in claim 1 wherein the controller is to receive the input time for the 3D printed part from a 3D printer operatively connected thereto.

6. The 3D part finishing system as defined in claim 1 wherein the controller is to determine the input time for the 3D printed part from a composition of the fused polymeric or polymeric composite build material and a geometry of the 3D printed part.

7. A method, comprising:
    determining a temperature for a liquid based on a boiling point of the liquid and a melting point of a fused polymeric or polymeric composite build material forming a three-dimensional (3D) printed part to be at least partially submerged into the liquid;
    determining an input time based on a characteristic of the 3D printed part to be at least partially submerged into the liquid; and
    at least partially submerging the 3D printed part into the liquid for the input time, the liquid being at the determined temperature.

8. The method as defined in claim 7 wherein the input time is 6 seconds or less.

9. The method as defined in claim 7 wherein the determining includes:
    identifying a temperature range between the boiling point of the liquid and the melting point of the fused polymeric or polymeric composite build material; and
    selecting the determined temperature from within the temperature range based on the characteristic of the 3D printed part, the input time, or combinations thereof.

10. The method as defined in claim 7 wherein the characteristic of the 3D printed part is selected from the group consisting of a composition of the fused polymeric or polymeric composite build material and a geometry of the 3D printed part.

11. The method as defined in claim 7 wherein the liquid is selected from the group consisting of glycerin, avocado oil, almond oil, canola oil, and combinations thereof.

12. The method as defined in claim 7 wherein prior to the at least partial submerging of the 3D printed part into the liquid, the method further comprises heating the liquid to the determined temperature.

13. The method as defined in claim 7 wherein prior to the submerging of the 3D printed part into the liquid, the method further comprises chilling the 3D printed part at a temperature ranging from about −50° C. to about 0° C. for a time period ranging from about 1 minute to about 60 minutes.

14. The method as defined in claim 7 wherein, prior to submerging, the 3D printed part is formed by:
- applying unfused polymeric or polymeric composite build material;
- selectively applying a fusing agent on at least a portion of the unfused polymeric or polymeric composite build material;
- exposing the unfused polymeric or polymeric composite build material to electromagnetic radiation to fuse the at least the portion of the unfused polymeric or polymeric composite build material in contact with the fusing agent to form a layer; and
- repeating the applying of the unfused polymeric or polymeric composite build material, the selectively applying of the fusing agent, and the exposing of the unfused polymeric or polymeric composite build material to electromagnetic radiation to iteratively build up multiple layers and form the 3D printed part.

15. The method as defined in claim 7, wherein the submerging of the 3D printed part into the liquid causes the 3D printed part to become: smooth; glossy; uniform in color; an intended color; or a combination thereof.

* * * * *